US005433056A

United States Patent [19]
Benson et al.

[11] Patent Number: 5,433,056
[45] Date of Patent: Jul. 18, 1995

[54] RADIATION-CONTROLLED DYNAMIC VACUUM INSULATION

[75] Inventors: David K. Benson, Golden; Thomas F. Potter, Denver, both of Colo.

[73] Assignee: Midwest Research Institute, Kansas City, Mo.

[21] Appl. No.: 194,933

[22] Filed: Feb. 14, 1994

Related U.S. Application Data

[60] Division of Ser. No. 960,885, Oct. 14, 1992, Pat. No. 5,318,108, which is a continuation-in-part of Ser. No. 856,840, Mar. 23, 1992, Pat. No. 5,175,975, which is a continuation-in-part of Ser. No. 181,926, Apr. 15, 1988, abandoned, and Ser. No. 535,782, Jun. 12, 1990, Pat. No. 5,157,893, which is a continuation-in-part of Ser. No. 181,926, Apr. 15, 1988, abandoned.

[51] Int. Cl.⁶ .............................................. E04C 2/34
[52] U.S. Cl. ............................. 52/794.1; 52/789.1; 428/332; 165/32
[58] Field of Search ................ 52/791, 792, 806, 809, 52/290, 785; 428/172, 432, 433, 138, 256, 332; 165/32

[56] References Cited

U.S. PATENT DOCUMENTS

| | | | |
|---|---|---|---|
| 3,152,033 | 10/1964 | Black et al. | 428/119 |
| 3,167,159 | 1/1965 | Bovenkerk | 189/34 |
| 3,424,622 | 1/1969 | Dechert | 136/161 |
| 3,450,196 | 6/1969 | Bauer | 165/32 |
| 3,565,671 | 2/1971 | Teeg et al. | 117/71 |
| 3,834,793 | 9/1974 | McConnell et al. | 350/160 |
| 3,873,181 | 3/1975 | Chivian et al. | 350/3.5 |
| 3,968,831 | 7/1976 | Xenophou | 165/1 |
| 4,224,980 | 9/1980 | Buchner | 165/32 |
| 4,235,956 | 11/1980 | Gross et al. | 429/112 |
| 4,393,095 | 7/1983 | Greenberg | 427/87 |
| 4,400,412 | 8/1983 | Scanlon et al. | 427/87 |
| 4,401,690 | 8/1993 | Greenberg | 427/87 |

Primary Examiner—Carl D. Friedman
Assistant Examiner—Kien Nguyen
Attorney, Agent, or Firm—Edna M. O'Connor

[57] ABSTRACT

A compact vacuum insulation panel comprising a chamber enclosed by two sheets of metal, glass-like spaces disposed in the chamber between the sidewalls, and a high-grade vacuum in the chamber that includes apparatus and methods for enabling and disabling, or turning "on" and "off" the thermal insulating capability of the panel. One type of enabling and disabling apparatus and method includes a metal hydride for releasing hydrogen gas into the chamber in response to heat, and a hydrogen grate between the metal hydride and the chamber for selectively preventing and allowing return of the hydrogen gas to the metal hydride. Another type of enabling and disabling apparatus and method includes a variable emissivity coating on the sheets of metal in which the emissivity is controllably variable by heat or electricity. Still another type of enabling and disabling apparatus and method includes metal-to-metal contact devices that can be actuated to establish or break metal-to-metal heat paths or thermal short circuits between the metal sidewalls.

4 Claims, 13 Drawing Sheets

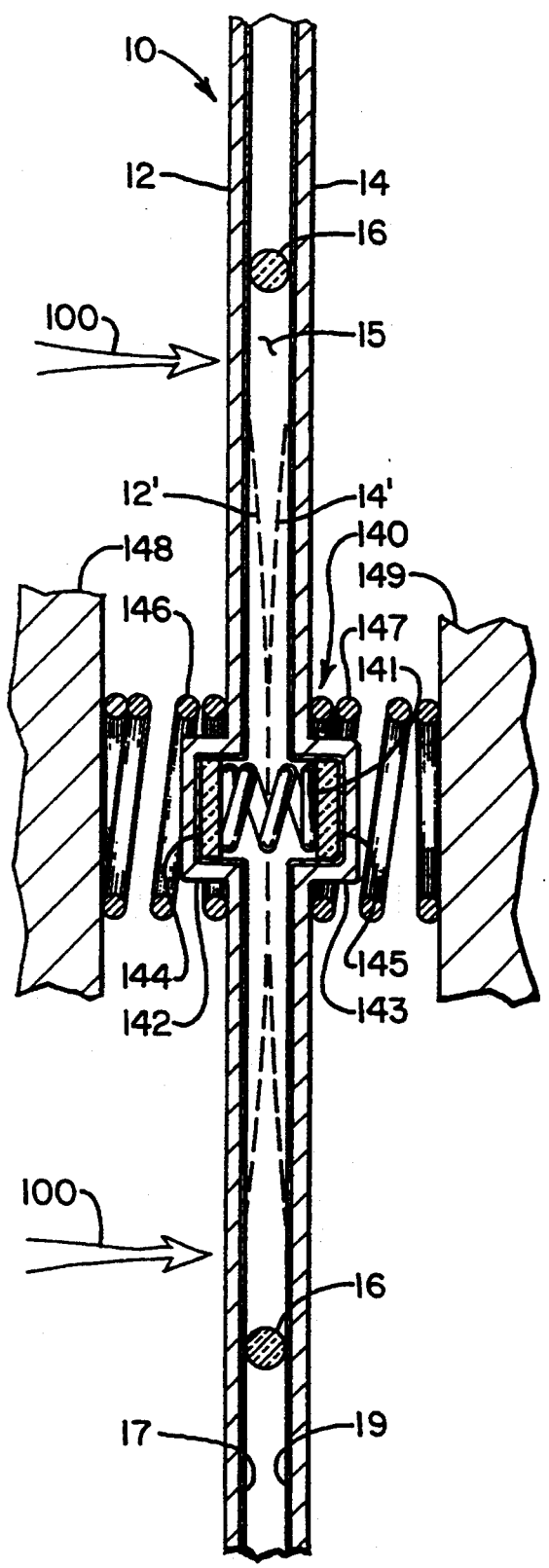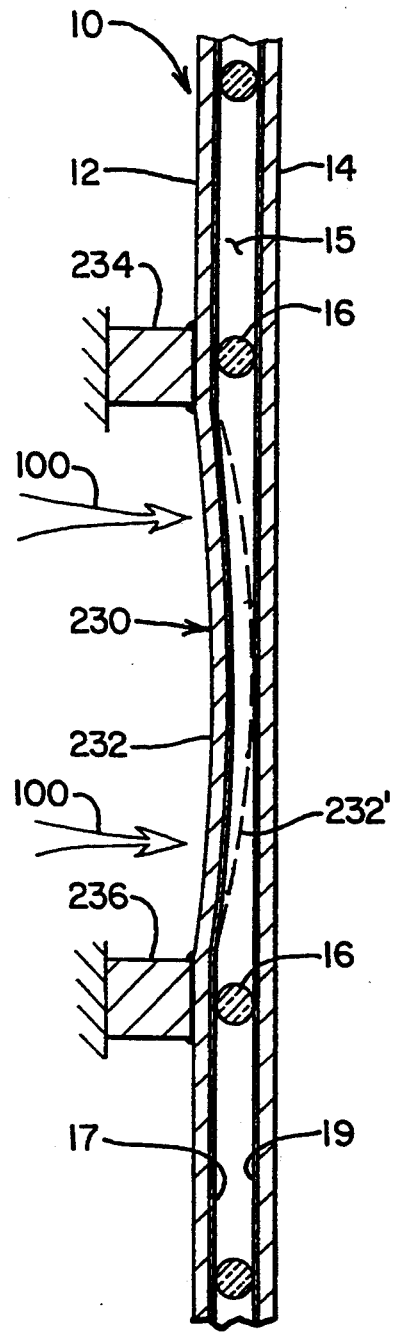
FIG. 20
FIG. 23

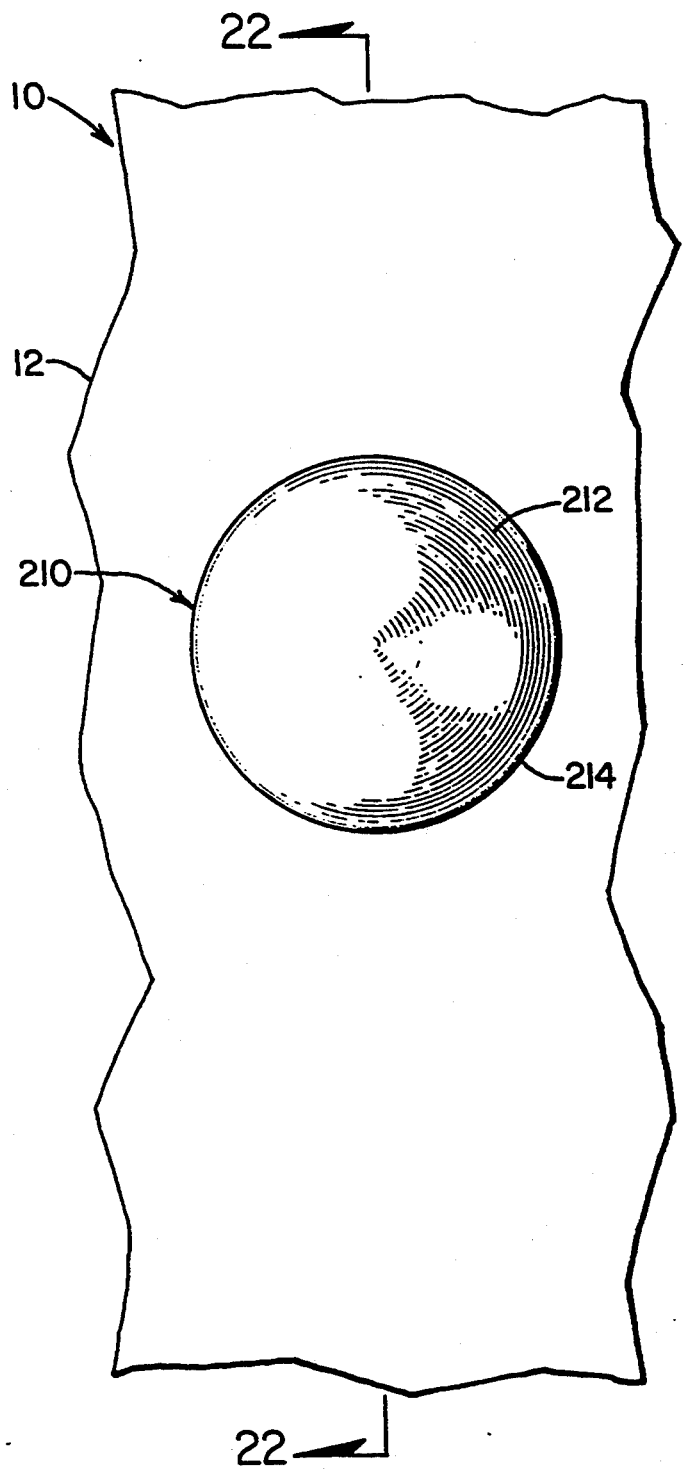
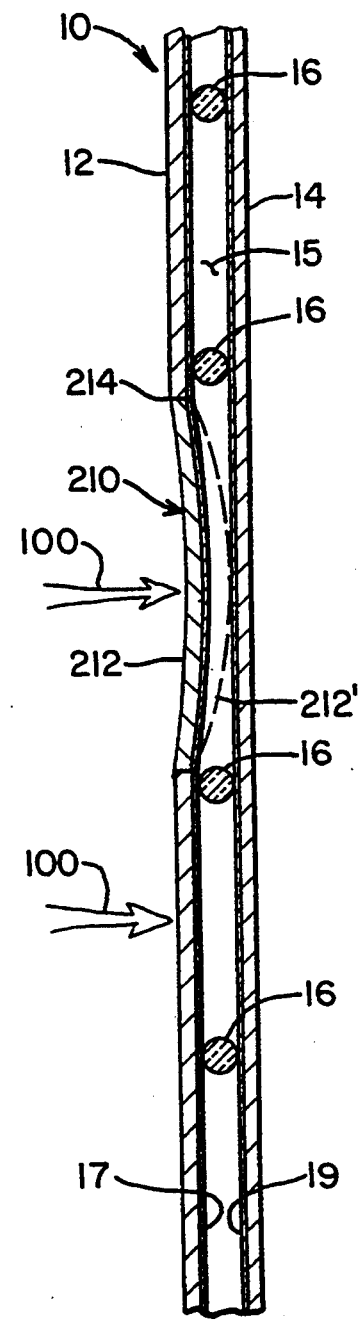
FIG. 21
FIG. 22

RADIATION-CONTROLLED DYNAMIC VACUUM INSULATION

CONTRACTUAL ORIGIN OF THE INVENTION

The United States Government has rights in this invention under Contract No. DE-AC02-83CH10093 between the U.S. Department of Energy and the National Renewable Energy Laboratory, a Division of Midwest Research Institute.

CROSS-REFERENCE TO RELATED PATENT APPLICATIONS

This patent application is a divisional application of U.S. Patent application Ser. No. 07/960,885 filed Oct. 14, 1992, (now U.S. Pat. No. 5,318,108) and which is a Continuation-in-Part of U.S. Patent application Ser. No. 07/856,840, filed on Mar. 23, 1992, (now issued U.S. Pat. No. 5,175,975), which is a Continuation-in-Part of U.S. Patent application, Ser. No. 07/181,926, filed Apr. 15, 1988, (now abandoned), and U.S. Patent application Ser. No. 07/535,782, filed on Jun. 12, 1990, (now U.S. Pat. No. 5,157,893) which is a Continuation-in-Part of U.S. Patent application Ser. No. 07/181,926, filed on Apr. 15, 1988 (now abandoned).

BACKGROUND OF THE INVENTION

1. Field of the Invention

This invention is related to vacuum insulation panels and more particularly to apparatus for selectively enabling and disabling, i.e., turning "on" and "off," the thermal insulating effect of compact vacuum insulation panels.

2. Description of the State of the Art

In our co-pending patent applications, Ser. No. 07/856,840 (now U.S. Pat. No. 5,175,975) and Ser. No. 07/535,782 (now U.S. Pat. No. 5,157,893), we described the need for better, more compact, and more versatile insulation products. The principal invention described in those patent applications provided a significant advancement in compact vacuum insulation that is thin, bendable, very effective insulation. That principal invention also provided compact vacuum insulation that has a very long useful life, yet has interior and exterior structures that are easy to manufacture. Such compact vacuum insulation is very effective for applications where the need for thermal insulation is constant and where static insulation can meet such a need. However, there are many applications that can benefit greatly by a changeable insulation that can be selectively enabled and disabled, i.e., turned "on" and "off," at desired times. For example, in applications where it is desired to retain heat for some period of time and then to dissipate heat for another period of time, it would be helpful to have insulation that can be turned "on" and "off."

There have been some apparatus and methods developed for enabling and disabling insulation. For example, U.S. Pat. No. 3,450,196 to P. Bauer discloses the general concept of enabling and disabling vacuum insulation panels by varying or controlling the gas pressure (vacuum) within the panels. The T. Xenophou patent, U.S. Pat. No. 3,968,831 applied that principle to building walls by connecting partial vacuums in the walls to a vacuum pump.

H. Bovenkerk, in his U.S. Pat. No. 3,167,159, disclosed the rather clever idea of using a metal hydride in combination with a small heating element, to selectively enable and disable vacuum insulation. The hydride naturally absorbs and retains hydrogen, and it can be heated to release the hydrogen into the vacuum insulation in large enough quantities to disable the vacuum insulation. Upon cooling, the hydride reabsorbs the hydrogen gas to again enable the vacuum insulation. Gross et al. used metal hydride and a heating element to heat the hydride for disabling and enabling vacuum insulation around a sodium-sulphur battery in his U.S. Pat. No. 4,235,956. While such Bovenkerk and Gross et al. devices can work for enabling and disabling vacuum insulation, they have the disadvantage of having to keep the heating element powered for as long as the insulation is to be disabled, i.e., for as long as good heat transfer is needed. In some applications, where power availability is limited and needs to be conserved, such a constant power drain can be very inconvenient, if not intolerable.

H. Buchner, in his U.S. Pat. No. 4,224,980, used the hydride hydrogen storage and release concept in a passive sense for essentially self-regulating heat retention and dissipation with vacuum insulation around a fuel injection/ignition chamber in a diesel engine. He uses the vacuum insulation to retain heat in the injection/ignition chamber as the diesel engine warms up, but he then relies on heat from the injection/ignition chamber itself to heat the hydride and release hydrogen to disable the vacuum insulation as the temperature of the diesel engine around the injection/ignition chamber rises. D. Dechert accomplished a similar result with the self-regulating vacuum insulation disclosed in his U.S. Pat. No. 3,424,622, to maintain the 300° C. operating temperature of a fused salt battery, although he used a solid or liquid with vapor pressure that increases with temperature, instead of a metal hydride and hydrogen, to vary the insulating effectiveness of the vacuum insulation. These Buchner and Dechert devices are effective for passive enabling and disabling of vacuum insulation at inherent temperatures according to the materials and systems designs, but they are not capable of individual control, or of being turned "on" and "off" at arbitrary or different temperatures.

SUMMARY OF THE INVENTION

Accordingly, it is a general object of this invention to provide effective compact vacuum insulation that can be enabled and disabled.

A more specific object of this invention is to provide compact vacuum insulation that can be enabled and disabled at arbitrary or different temperatures.

Another specific object of the present invention is to provide compact vacuum insulation that can be enabled and disabled in a digital manner, i.e., either "on" or "off," with consumption of power only at the transition between tile enabled state and tile disabled state or vice versa, but without requiring power to maintain it in either the enabled or disabled state.

Still another object of this invention is to provide compact vacuum insulation that has improved passive control devices for switching the insulation "on" and "off" in response to changes in temperature.

Additional objects, advantages, and novel features of the invention are set forth in part in the description that follows, and in part will become apparent to those skilled in the art upon examination of the following specification, or may be learned by the practice of the invention. The objects and advantages of the invention may be realized and attained by means of the instrumentalities, combinations, and methods particularly pointed out in the appended claims.

To achieve the foregoing and other objects, and in accordance with the purposes of the present invention, as embodied and broadly described herein, the apparatus of this invention may comprise two metal sidewalls separated by a vacuum chamber and held apart by glass-like spacers and sealed around the edges with metal-to-metal welds and one or more disabling features capable of frustrating the ability of the vacuum chamber to inhibit the flow of heat from one sidewall to the other. Disablement by increasing infrared radiation from one sidewall to the other is implemented by either a thermochromic coating or an electrochromic coating on at least one sidewall.

BRIEF DESCRIPTION OF THE DRAWINGS

The accompanying drawings, which are incorporated in and form a part of the specifications, illustrate the preferred embodiments of the present invention, and together with the description serve to explain the principles of the invention.

In the Drawings:

FIG. 20 is an enlarged cross-sectional view of a compact vacuum insulation panel equipped with still another alternate embodiment metal-to-metal switch that pushes the two sidewalls together against a separating bias;

FIG. 21 is a side elevation view of an alternate embodiment thermal shorting switch with a nonlaminated bimetallic actuating element according to this invention;

FIG. 22 is a cross-sectional view of the thermal shorting switch taken along line 22—22 of FIG. 21;

FIG. 23 is a cross-sectional view of another alternate embodiment thermal shorting switch with an anchor-confined depression as an actuating mechanism;

DESCRIPTION OF THE PREFERRED EMBODIMENTS

Figure 1:
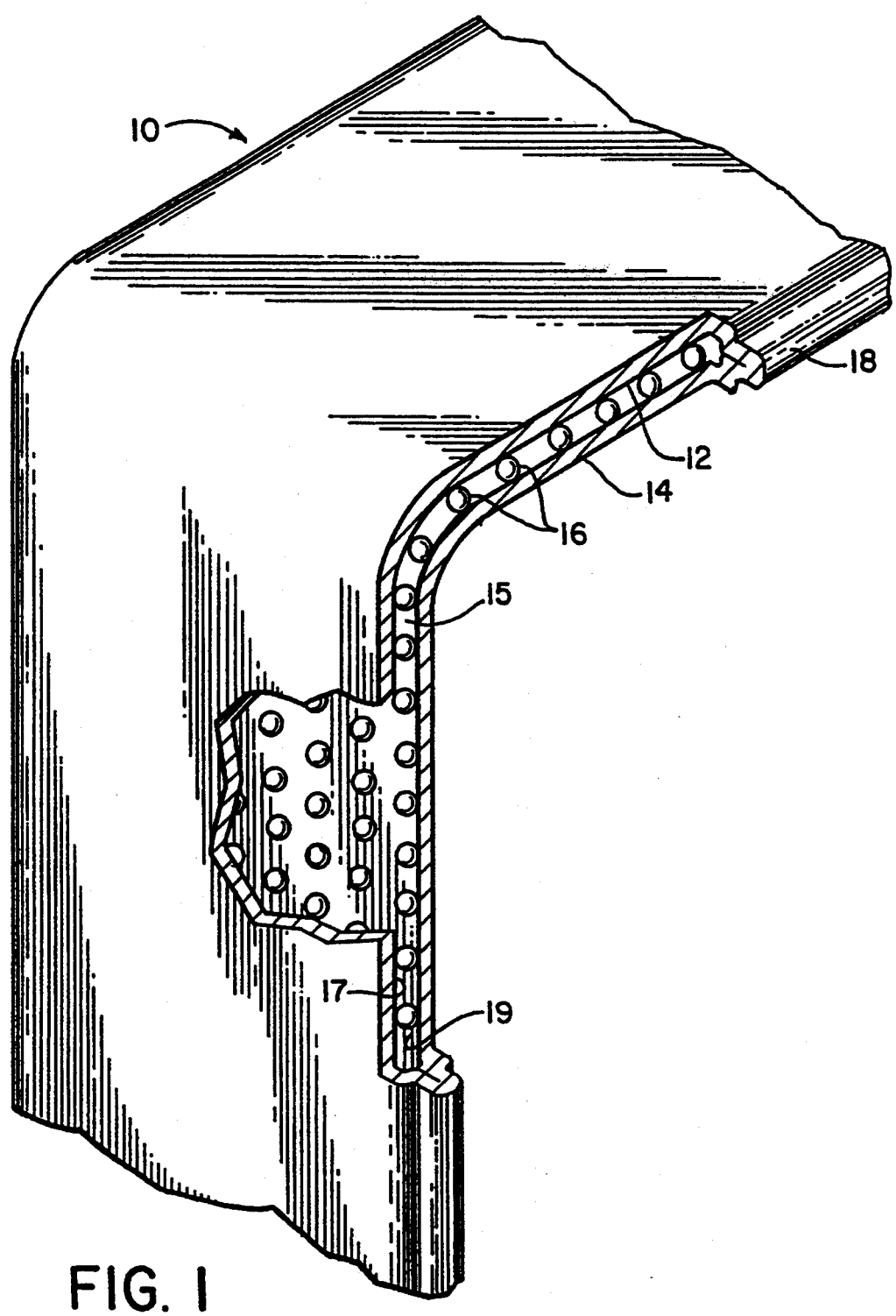
FIG. 1 is a perspective view of a compact vacuum insulation panel.
Figure 2:
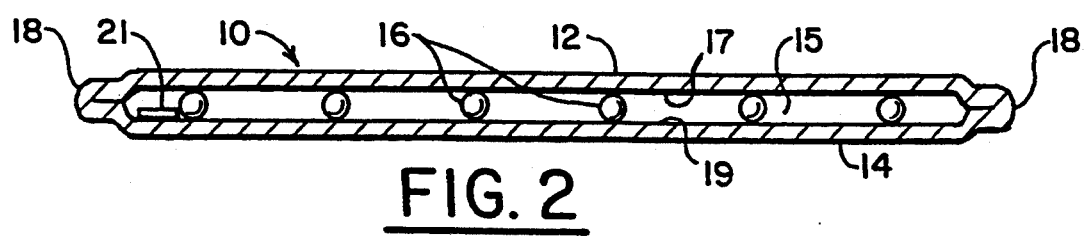
FIG. 2 is a cross-sectional view of the compact vacuum insulation panel of FIG. 1.
Figure 3:
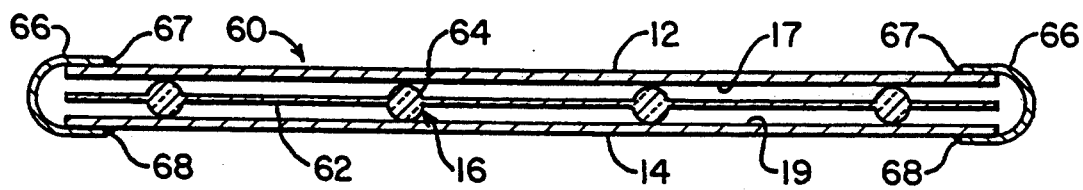
FIG. 3 is a cross-sectional view of a compact vacuum insulation panel with alternate web and nodule spacers and a foil edge seal.

Compact vacuum insulation, for purposes of describing the embodiments of this invention is preferably, although not necessarily, an ultra-thin insulation panel 10, as illustrated in FIGS. 1 and 2. The compact vacuum insulation panel 10 is preferably constructed with two sidewalls 12, 14 positioned in parallel, closely spaced relation to each other and sealed at the edges by metal-to-metal welds 18 to enclose a space or vacuum chamber 15. In some applications, especially for smaller panels 60, as illustrated in FIG. 3, it may be beneficial to provide thinner metal foil leaves 66 at the joints between the edges of the sidewalls 12, 14, but still utilizing metal-to-metal welds 67, 68 to make the seals. Such thinner foil leaves 66 can inhibit neat transfer from one sidewall 12 to the other sidewall 14 around their edges more than the direct metal-to-metal welds 18 of panel embodiment 10 in FIGS. 1 and 2.

Glass, ceramic, porcelain-coated metal, or other glass-like spacers 16 are positioned at spaced intervals between the sidewalls 12, 14 to hold them apart when the space of chamber 15 is evacuated. The spacers 16 can be discrete spherical beads, as illustrated in FIGS. 1 and 2, or they can be nodules 64 protruding from webs 62, as illustrated in the panel 60 in FIG. 3. The webs 62 can be the same material as the nodules 64, such as glass, ceramic, or other glass-like materials, or they can be metal mesh with glass-like beads or porcelain-coated metal spacers functioning as protrusions or nodules 64. A getter material 21 may be included, as shown in FIG. 2, to attract and withdraw extraneous gaseous molecules from the chamber 15.

The thinner foil edge leaves 66 do not necessarily have to be used with the web 62 and nodule 64 structures or vice versa. Those are independent alternatives that are both illustrated in the embodiment 60 of FIG. 3 for convenience only.

Other suitable spacer structures, methods of fabrication, preferred parameters, and alternate embodiments can be found in the U.S. Pat. No. 5,175,975, which is a continuation of U.S. Patent application Ser. No. 07/181,926 (now abandoned) and U.S. Pat. No. 5,157,893, which is a Continuation-in-Part of U.S. Patent application Ser. No. 07/181,926 (now abandoned), and in U.S. Pat. No. 5,107,649, all of which are incorporated by reference herein. However, the important combination of features to obtain effective compact vacuum insulation according to this invention include: (1) the thin and hard but bendable metal wall sheets 12, 14 closely spaced together; (2) glass or glass-like spacers 16 or 64 that not only have low thermal conductivity, but also do not evolve gases, like plastics and other materials would; (3) the glass or glass-like spacers 16 or 64 that are discrete objects in spaced apart relation, not powders or fibers that would trap gases, provide more thermal conductivity, and interfere with the leak-proof integrity of welded seals; (4) the spacers 16 or 64 that are rounded or pointed to provide "point" or "near point" contact, not flat surface contact, with the wall sheets 12, 14; (5) the vacuum in the space or chamber 15 is sufficient to meet the criteria of having the mean free path between molecular collisions greater than the distance between wall sheets 12, 14, preferably lower than $10^{-5}$ torr, and ideally at least $10^{-6}$ torr; (6) the edge seals 18 are metal-to-metal welds that can seal the vacuum for twenty years or longer, not plastics, glass, adhesives, or clamp strips that leak or evolve gases enough to disable the insulative effect in a short time or need intermittent re-evacuation; and (7) low emissivity surfaces or surface coatings 17, 19 on the sidewalls 12, 14.

Figure 4:
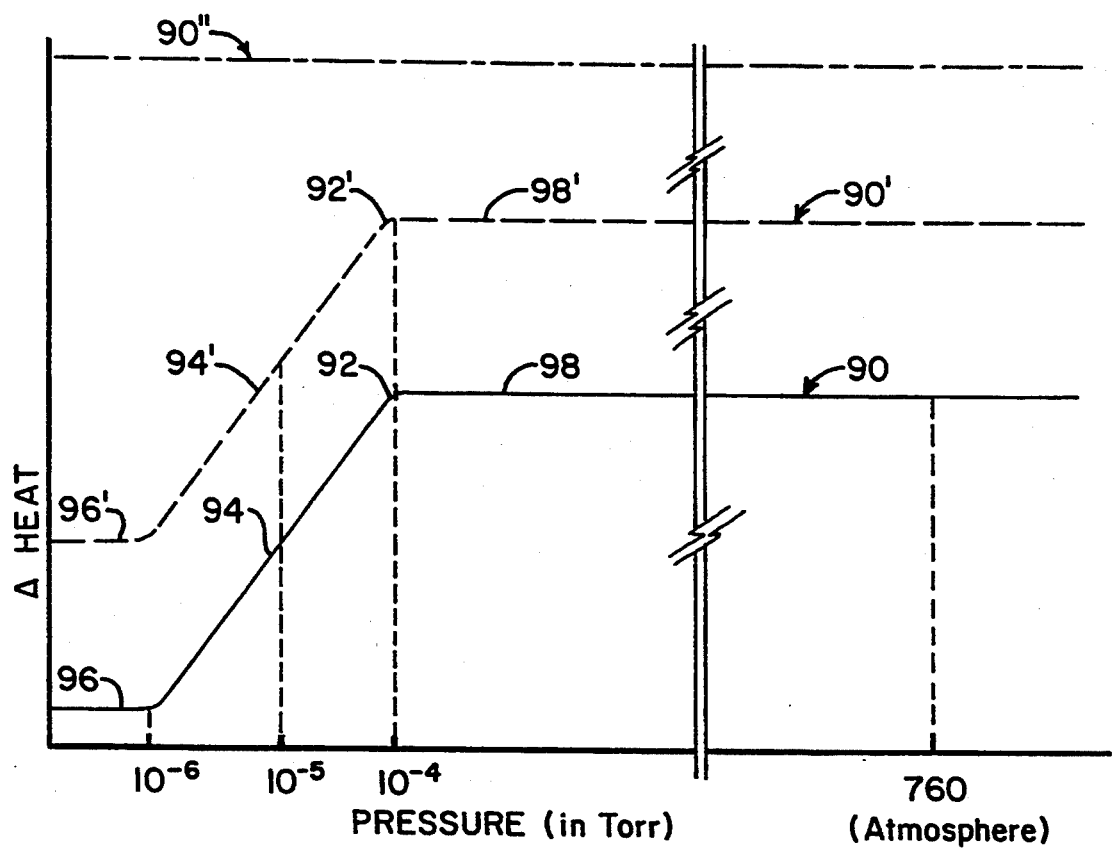
FIG. 4 is a graphical representation of the insulation effectiveness of compact vacuum insulation against heat transfer as affected by variations in gas pressure, variations in emissivity, and metal-to-metal contacts alone and in relation to each other.

When the space or chamber 15 between the sidewalls 12, 14 is evacuated, heat transfer across the panel 10, 60 can be substantially inhibited. The extent of the vacuum in relation to the distance between the sidewalls 12, 14 can determine the relative amount or rate of heat transfer. Referring to FIG. 4, the rate of heat transfer, Δ HEAT, is graphed in log relation to gas pressure, PRESSURE (in torr), for ultra-thin insulation according to this invention, where the spacing between sidewalls 12, 14 is preferably in the range of about 2 to 5 mm but practically about 0.5 to 20 min. Essentially, when the vacuum in chamber 15 is sufficient to maintain the gas pressure at about $10^{-6}$ torr or less, the heat transfer across the panel continues at a more or less substantially constant rate, as shown by the portion 96 of the curve 90 in FIG. 4, regardless of additional pressure drop. In that vacuum range the heat transfer is dominated almost entirely by the heat transfer mechanisms of infrared radiation across chamber 15 and conduction through the spacers 16, neither of which heat transfer mechanisms is affected significantly by gas pressure. The exact gas pressure at which this overriding domination of heat transfer by radiation across chamber 15 and by conduction through spacers 16 occurs depends not only on the distance between sidewalls 12, 14, but also on the temperature. In general, the hotter the temperature, the more heat transfer will tend to be dominated by radiation. However, for panels 10 constructed according to the description above, that effect occurs in the range of about $10^{-6}$ torr. Therefore, as illustrated by the portion 96 of the curve 90, decreasing the gas pressure below about $10^{-6}$ torr does not increase the effective insulation function of the compact vacuum insulation panel 10. Increasing the gas pressure above $10^{-6}$ torr, however, does decrease the insulative effect of the insulation panel 10.

As the gas pressure is raised above $10^{-6}$ torr, the heat transfer across the compact insulation panel 10 increases in a fairly linear manner, as shown by the portion 94 of the curve 90 in FIG. 4. This increase in heat transfer results from having more gas molecules available in chamber 15 to conduct heat energy from one sidewall 12 to the other 14, or vice versa, in sufficient quantities to add to the heat transfer that occurs by radiation and conduction through spacers 10. The linear relationship between increase in gas pressure above about $10^{-6}$ torr and the resulting increase in heat transfer, as shown by tile portion 94 of tile curve 90 in FIG. 4, indicates that the more gas molecules are available in the chamber 15 to conduct heat, the more heat will be conducted from one sidewall 12 or 14 to the other. However, when the gas pressure in the chamber 15 increases to about $10^{-4}$ torr ($10^{-7}$ atmospheres), there is a pronounced bend 92 in the curve 90 in FIG. 4 to essentially a flat line portion 98, where increase in gas pressure does not result in a corresponding, in fact any, significant increase in heat transfer. The area of the bend 92 at about $10^{-4}$ torr is where there are sufficient gas molecules in the chamber 15 such that the mean free path between the molecules is about equal to the distance between the sidewalls 12, 14. Consequently, to obtain any beneficial increase in insulating effect from the enclosed chamber 15 over an enclosed chamber with air or other gas at normal atmospheric pressure (760 torr), the vacuum has to be at least sufficient to remove enough gas molecules so that the mean free path between collisions of the molecules is greater than the distance between the sidewalls 12, 14, which occurs at about $10^{-4}$ torr for the ultra-thin compact vacuum insulation according to this invention.

If the low emissivity coatings 17, 19 on the sidewalls 12, 14 were eliminated, the resulting heat transfer would be increased by the resulting increase in radiation from one sidewall 12 or 14 to the other, as indicated by the curve 90' in FIG. 4. Essentially, all of the portions 92, 94, 96, and 98 of curve 90 remain in substantially the same relation to each other in the resulting curve 90', as indicated at 92', 94', 96' and 98', except that the actual heat transfers at those portions are higher by the amount of the increased radiation that occurs without the low emissivity coatings.

On the other hand, a metal-to-metal contact between the sidewalls 12, 14 is such an effective heat conductor that it causes the insulation effect of the panel 10 to be virtually eliminated in the vicinity of the metal-to-metal contact, regardless of the extent of the vacuum in chamber 15 and regardless of the presence or absence of the emissivity coatings 17, 19. The effect of such a metal-to-metal contact on heat transfer between the sidewalls 12, 14 in relation to vacuum or gas pressure and emissivity is illustrated by the curve 90" in FIG. 4. It is so effective at eliminating resistance to thermal transfer across the compact vacuum insulation that it can be considered analogous from a thermal perspective to a short circuit in an electrical context, i.e., a thermal short circuit, or sometimes simply referred to herein as a "thermal short."

The dynamic or changeable compact vacuum insulation according to this invention varies the resistance to heat flow between sidewalls 12, 14 by varying one or more of the mechanisms described above, i.e., molecular or gas conduction, radiation or emissivity, and metal-to-metal contact or thermal short. The variation in gas conduction varies heat transfer along the portion 94 of curve 90 in FIG. 4, while the variation in emissivity or radiation varies heat transfer between the curves 90 and 90'. The metal-to-metal contact or thermal short, on the other hand, varies heat transfer from either curve 90 or 90', or from anywhere between curves 90 and 90', to curve 90", as will be described in more detail below.

As mentioned above, the curve 90" illustrates the effect of heat transfer of a thermal short in relation to gas pressure and emissivity, but it is representative of that effect only at or near the location of the metal-to-metal contact that causes the thermal short. As distance along either sidewall 12 or 14 from the metal-to-metal contact increases, the full effect of the change in heat transfer as indicated by curve 90" diminishes. Therefore, for a dynamic compact vacuum insulation panel that has a large surface area, partial or full transition between the relative heat transfer rates indicated by curves 90 and 90" in FIG. 4 can be implemented by providing a plurality of such thermal shorts at spaced distances from each other. Such thermal shorts dispersed over the surface of the compact vacuum insulation according to this invention can be turned "on" and "off" individually or in various combinations, either automatically, or by active control, as will also be described in more detail below.

Figure 5:
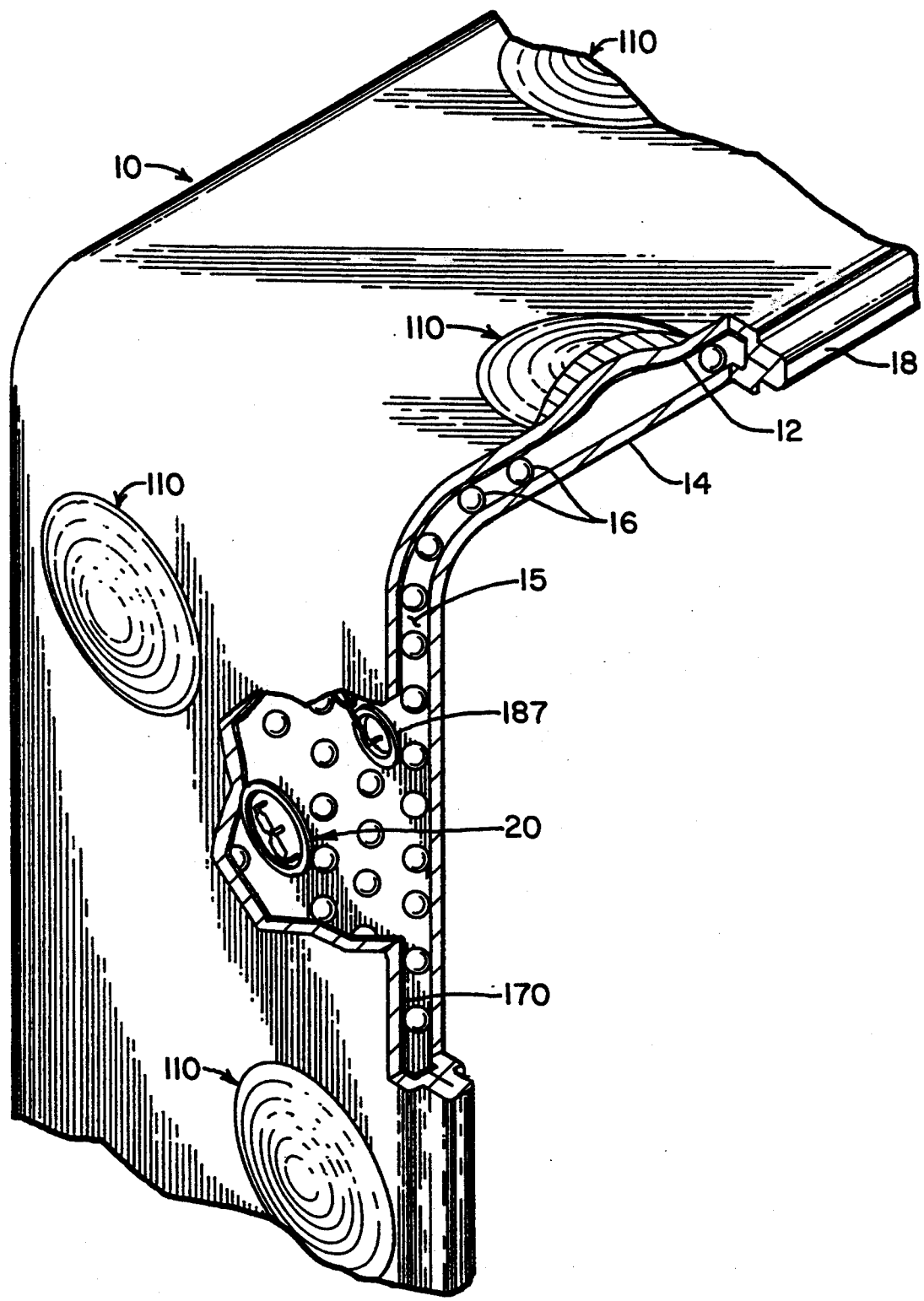
FIG. 5 is a perspective view of a compact vacuum insulation panel equipped according to this invention with a gas controller apparatus, variable emissivity coating, and a plurality of bimetallic laminate metal-to-metal switches for selectively disabling the insulation panel.

The compact vacuum insulation panel 10 is shown in FIG. 5 equipped with exemplary apparatus, according to this invention, for varying the thermal heat transfer or insulative characteristics in a dynamic manner by utilizing the principles discussed above. It includes gas control apparatus 20 for varying the amount and pressure of gas in the chamber 15, a variable emissivity coating 170 on the interior surface of sidewall 12, and a plurality of bimetallic laminate switches 110. The gas control apparatus 20 varies heat transfer by molecular conduction; the variable emissivity coating 170 varies heat transfer by varying infrared radiation; and the bimetallic laminate switches 110 vary the thermal transfer by creating thermal shorts through metal-to-metal contact between sidewalls 12, 14. Each of them can partially or completely turn the compact vacuum insulation panel 10 "on" and "off" to varying degrees and at varying temperatures and speeds, or they can be used together or in sequence for special effects to maximize or to optimize dynamic control of the compact vacuum insulation panel 10 for various applications. The gas control apparatus 20, variable emissivity coating 170, and bimetallic laminate switches 110 are shown in more detail as they are mounted in the compact vacuum insulation panel 10 in the enlarged cross-sectional view of FIG. 6. However, for purposes of a brief introduction, the gas control apparatus 20 preferably includes a metal hydride material for selectively storing, releasing, and retrieving hydrogen gas in the vacuum chamber 15. It preferably varies the vacuum pressure from at least as low as $10^{-6}$ torr to at least as high as about $10^{-4}$ torr. As shown by the portion 94 of curve 90 in FIG. 4, such a variation in gas pressure between $10^{-6}$ torr and $10^{-4}$ torr results in corresponding variations of heat transfer through the compact vacuum insulation panel 10.

The variable emissivity coating 170 is preferably a thin film of a thermochromic material that changes emissivity as a function of changing temperature. It can be used to vary heat transfer through panel 10 between curves 90 and 90' in FIG. 4. Materials such as vanadium oxide that change emissivity as a function of temperature can be used as a passive control, for example, increasing emissivity, thus heat transfer, as temperature and vice versa. As an alternative, however, an electrochromic material such as nickel hydroxide ($Ni(OH)_2$) or tungsten trioxide ($WO_3$), which varies emissivity in response to application of electric potential, can be used for active variation in heat transfer resistance of the compact vacuum insulation panel 10 with external controls. It is preferable when using a variable emissivity coating 170 on one sidewall 12 to either eliminate the low emissivity coating 19 from the other sidewall 14, or to use a variable emissivity coating 170 on each sidewall 12, 14, because a low emissivity coating 19 on one sidewall 14, in combination with a variable emissivity coating 170 on the other sidewall 12, could defeat or thwart any increased radiative heat transfer produced when increasing the emissivity of the variable emissivity coating 170. Therefore, while the variable emissivity coating 170 is shown on only one sidewall 12, preferably the hot sidewall that is adjacent the heat source being selectively insulated, an additional variable emissivity coating could be used on the other sidewall 14, too.

The bimetallic laminate switch 110 causes a thermal short between sidewalls 12, 14, which varies heat transfer as described above and indicated between curves 90 and 90" in FIG. 4. Such bimetallic laminate switches are conducive to both passive and active applications, as will be described in more detail below. Such metal-to-metal contacts can also be induced by other mechanisms, such as nonlaminate structures of different metal combinations, externally anchored expandable metals, or metals that are plastically deformable in one temperature range, but which become elastic and return to an original memory configuration at another temperature range.

Figure 10:
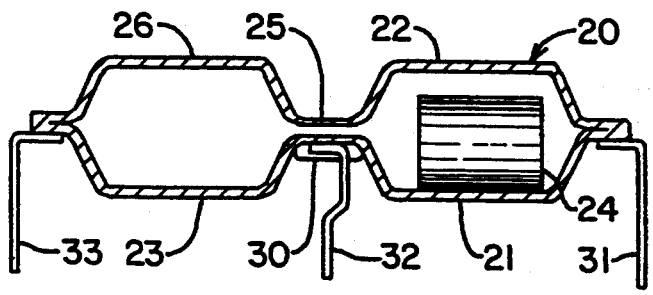
FIG. 10 is a cross-sectional view of the gas control apparatus taken along line 10—10 of FIG. 9.
Figure 11:
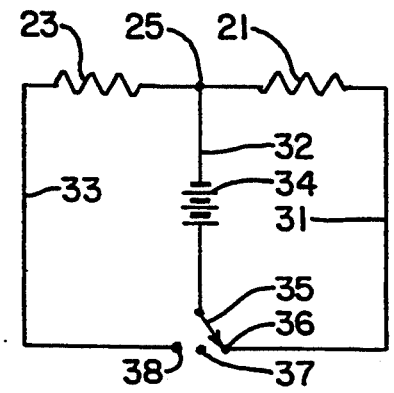
FIG. 11 is a schematic diagram of an electric heating circuit for the gas control apparatus of FIG. 10.

The gas control apparatus 20 is shown in more detail in FIGS. 6-11. It comprises a container 22, a metal hydride 24, and a hydrogen gate 26. Referring primarily to FIGS. 10 and 11, the container 22 contains a pellet of metal hydride 24, such as zirconium hydride, which has the property of absorbing and retaining hydrogen atoms in its crystal lattice at cooler temperatures, but it releases and dissipates the hydrogen atoms at higher temperatures. Hydrogen, which is a low molecular weight diatomic gas, has a very high thermal conductivity, even at very low pressures in the range of $10^{-5}$ atmosphere ($7.5 \times 10^{-3}$ torr), so a very small amount of hydrogen is sufficient to fill a large vacuum insulation panel to a pressure that is sufficient to transfer heat across the chamber 15 in panel 10 at a relatively high rate. Therefore, a small amount of metal hydride 24 can be heated to release enough hydrogen into chamber 15 to effectively disable or "turn off" the compact vacuum insulation panel 10. Then, when the metal hydride 24 is allowed to cool, it will quickly reabsorb and retain the hydrogen from the vacuum chamber 15, thereby re-enabling or "turning on" the insulative effect of the panel 10. Of course, the extent of the insulative effect of panel 10 can be varied by controlling the temperature to which the metal hydride 24 is heated, such as to heat it only enough to release a very small amount of hydrogen into chamber 15, thereby only partially "turning off" the insulative effect of panel 10.

In applications where an environment needs to be insulated to retain heat at some times, but to dissipate excess heat at other times, it may be desirable to have a passive or self-regulating dynamic vacuum insulation that turns "on" and "off" automatically as a function of the temperature in the environment to be controlled. In such applications, it might be satisfactory to position the metal hydride outside the panel (not illustrated), where it is exposed to the environment to be controlled, or perhaps inside chamber 15, but in contact with one of the metal sidewalls 12, 14 (not illustrated) for the purpose of having the metal hydride 24 temperature follow the temperature of the environment. Then, when the environment to be controlled becomes too hot, the metal hydride 24 will automatically begin releasing hydrogen into chamber 15 to partially or completely "turn off" the insulation, thus allowing heat from the environment to dissipate through tile insulation panel 10. The metal hydride can be selected or designed to release hydrogen at the desired transition temperature for the compact vacuum insulation panel 10 to change from an insulating to a noninsulating device.

The metal hydride 24 can also be heated artificially, such as with an electric resistor or heater element 21, to release tile hydrogen and disable the insulation panel 10, which is an example of an active control to turn the insulation panel 10 "on" and "off." To minimize the adverse effects of a parasitic power drain and an unwanted additional continuous heat source, tile gas control apparatus 20 of the present invention provides a hydrogen gate 26 in combination with the metal hydride container 22. In the gas control apparatus embodiment 20 shown in FIGS. 6–11, the hydrogen gate 26 is the metal enclosure that comprises the container 22. The function of the hydrogen gate 26 is to allow hydrogen to escape from the container 22 and pass into the chamber 15 of panel 10 when the metal hydride 24 is heated for that purpose, but to let the hydrogen re-enter tile container 22 to be reabsorbed by the cooled metal hydride 24 only at selected times that are actively controllable, independent of the temperature of the metal hydride 24.

To perform the hydrogen gate function described above, the walls of the container 22 comprise a metal that is selectively permeable to hydrogen gas, thereby providing a controllable hydrogen permeable separator or gate 26 between the metal hydride 24 and the vacuum chamber 15. For example, the walls of container 22 can be comprised of palladium or a suitable palladium alloy, which has the characteristic of being permeable to hydrogen gas when hot, but very impermeable to hydrogen gas when cooled. Therefore, when it is desired to turn the compact vacuum insulation "off," both the metal hydride 24 and the walls or hydrogen gate 26 of container 22 are heated. The hot metal hydride 24 releases hydrogen, and the hot walls or gate 26 allow the released hydrogen to pass into vacuum chamber 15. Then, when the compact vacuum insulation panel 10 is sufficiently disabled or "turned off" by the additional hydrogen gas in chamber 15, the heat to both the metal hydride 24 and the palladium foil gate 26 can be "turned off" to eliminate power consumption and unnecessary heat production. The resulting cooled metal hydride 24 will create a reduced hydrogen pressure gradient as it tries to reabsorb hydrogen into its crystal lattice, but the cooled palladium hydrogen gate 26 simultaneously becomes impermeable to hydrogen gas and blocks the hydrogen gas in chamber 15 from re-entering container 22 and reaching the metal hydride 24. Therefore, the compact vacuum insulation panel 10 is disabled or "turned off" by temporarily heating both the metal hydride 24 and gate 26, and it remains disabled or "turned off" after both are cooled without tile need for continuous heating or power consumption.

When it is desired to re-enable or "turn on" the compact vacuum insulation panel 10, only the palladium gate 26 is heated to become permeable to hydrogen, while leaving the metal hydride 24 cool. In that condition, the hydrogen gas in the chamber 15 quickly migrates through the hydrogen gate 26 to the reduced hydrogen pressure area in container 22 that is created by the cool metal hydride 24 and is quickly reabsorbed by the metal hydride 24, thereby re-evacuating the chamber 15 of hydrogen gas, thus re-enabling tile compact vacuum insulation panel 10 to inhibit heat transfer through panel 10.

In the preferred embodiment of the gas control apparatus 20, the container 22 has its palladium metal foil wall or gate 26 shaped to provide two enlarged cylindrical compartments 21 and 23 connected by a narrow hollow neck or duct 25. The metal hydride pellet 24 is positioned in compartment 21. Each portion or compartment 21, 23 can be heated separately or individually to accomplish the hydrogen gate functions described above. To provide such selective heating, an electric current can be passed through the palladium walls of either compartment 21 or 23. The resistance of the palladium foil walls to the flow of electric current creates the desired heat in compartment 21, both to release hydrogen from the metal hydride 24 and to make the wall or gate 26 of compartment 21 permeable to hydrogen, so the hydrogen can flow into chamber 15. However, the flow of electric current through the palladium foil wall of compartment 23 creates the necessary heat to make only the wall or gate 26 of compartment 23 permeable to hydrogen, while leaving the compartment 21 and the metal hydride 24 relatively cool. Therefore, when only compartment 23 is heated, its palladium foil walls or gate 26 allow hydrogen from vacuum chamber 15 to flow back into the compartment 23 of container 22. Once it is in compartment 23, the hydrogen can pass through the narrowed neck or duct 25 into compartment 21, where it can be reabsorbed by the cool metal hydride 24. The enlarged cylindrical compartment 23 provides sufficient surface area to allow passage of the hydrogen from chamber 15 into container 22 quickly, while the narrow neck 25 inhibits heat flow from the hot compartment 23 to the relatively cooler compartment 21. The palladium foil can also be thinner at the neck 25, as illustrated in FIG. 10, to further inhibit heat flow therethrough from compartment 23 to compartment 21. As soon as the chamber 15 has been re-evacuated of hydrogen gas, the electric current flowing through compartment 23 can be switched off, thereby allowing the entire gas control apparatus 20 to cool until the next time it is desired to disable or "turn off" the compact vacuum insulation panel 10.

Of course, other heating elements positioned adjacent the respective compartments 21 and 23 can be used instead of flowing electric current directly through the walls of compartments 21 and 23, but the embodiment described above provides a compact structure that can be positioned inside the chamber 15 of compact vacuum insulation panel 10. The selected electric currents can be delivered to the container 22 by three wire conductors 31, 32, and 33. The palladium foil walls of compartments 21, 23 can be crimped at their ends 27, 29 to provide attachment points for wires 31, 33, respectively. The common wire 32 can be connected directly to the neck 25, or a foil extension 30 of neck 25 can be provided as an attachment surface.

An appropriate simple electric circuit to operate the hydrogen gas control apparatus 20 described above is illustrated in FIG. 11. The resistors 21 and 23 in FIG. 11 can represent the compartments 21 and 23 of container 22, described above, or separate heating elements if desired. An electric power source 34 can be connected selectively to the resistors 21, 23 by a switch 35. When the switch 35 is connected to node 36, current flows through resistor or compartment 21 via wires 31 and 32 to heat compartment 21 and metal hydride 24, to release hydrogen to vacuum chamber 15. Alternatively, when switch 35 is connected to node 38, current flows through resistor or compartment 23 via wires 32 and 33, to heat only compartment 23 for retrieving the hydrogen gas from vacuum chamber 15. When switch 35 is positioned at node 37, it is an open circuit where there is no power consumption. This open circuit condition is used at all times when the compact vacuum insulation panel 10 is maintained either in its enabled or "turned on" insulation mode or in its disabled or "turned off" insulation mode. Electric power is consumed and heat generated only during transitions between the enabled and disabled insulation modes, as described above.

Figure 6:
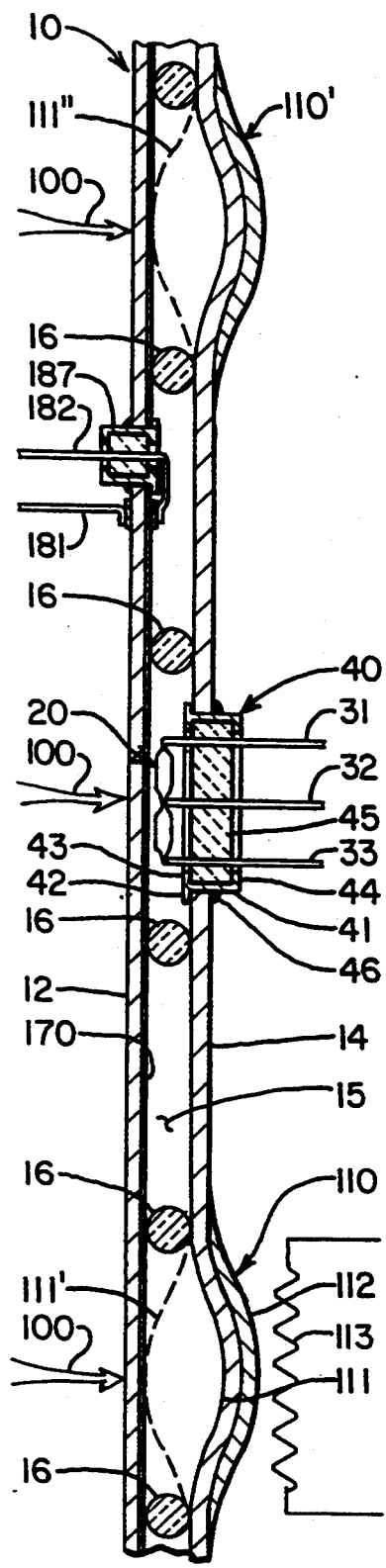
FIG. 6 is a cross-sectional view of the compact vacuum insulation panel of FIG. 5.
Figure 7:
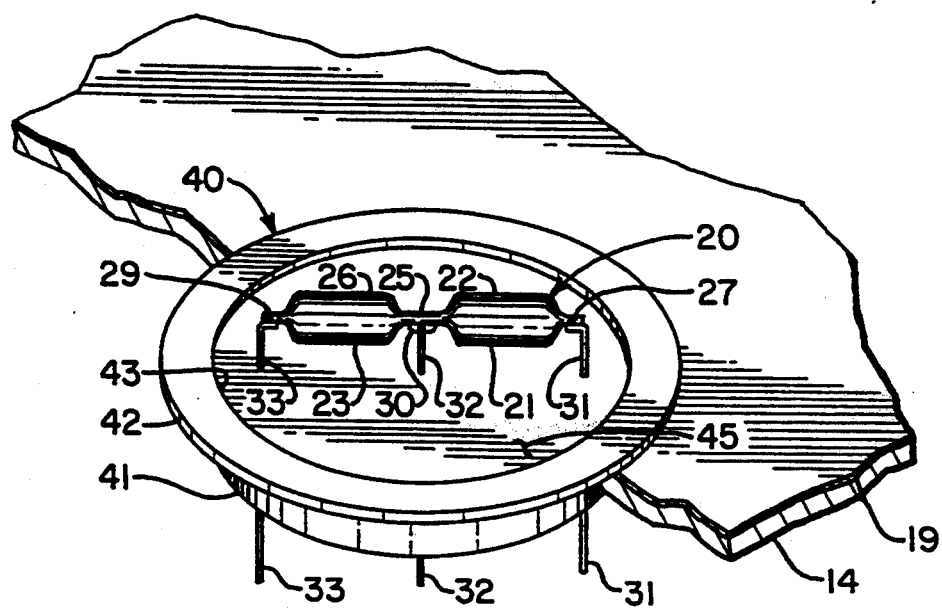
FIG. 7 is an enlarged perspective view of the gas control apparatus mounted in a sidewall of the insulation panel.
Figure 8:
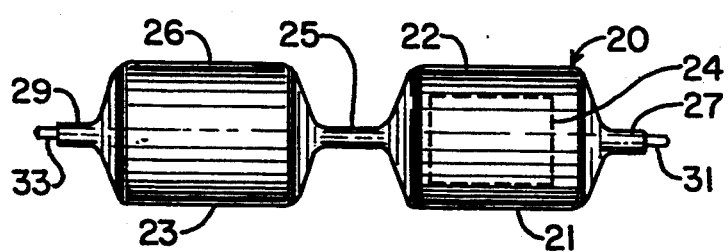
FIG. 8 is an enlarged plan view of the gas control apparatus for use with the compact vacuum insulation according to this invention.
Figure 9:
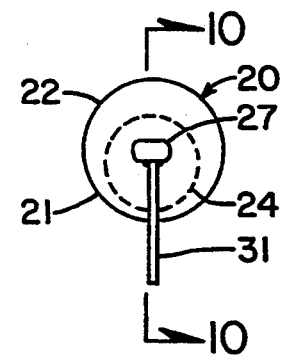
FIG. 9 is an enlarged and elevation view of the gas control apparatus.

Referring now primarily to FIGS. 6 and 7, the gas control apparatus 20, as described above, is structured for mounting inside chamber 15 of compact vacuum insulation panel 10. As such, it is shown in combination with a vacuum-tight mounting insert 40 that accommodates the passage of wires 31, 32, 33 through sidewall 14 of panel 10 without compromising the integrity of the vacuum sealed chamber 15, which is essential to a long-life dynamic compact vacuum insulation panel 10. This mounting insert 40 comprises a metal annular container ring 41 that has an external flange 42 extending radially outward from one end and two internal flanges 43, 44 extending radially inward from respective opposite ends. The container ring 41 is filled with an impermeable, non-outgassing ceramic material 45 that is an electric insulator around metal wires 31, 32, 33. Such insulator ceramic-to-metal seals are wellknown to persons skilled in that art. Therefore, suffice it to say that the ceramic material may be magnesium oxide and the metal ring 41 may be stainless steel. A vacuum proof seal between the metal ring 41 and the ceramic material 45 can be maintained by metal brazing. The mounting insert 40 is fastened in sidewall 14 by welding 46 around its peripheral surface.

Figure 12:
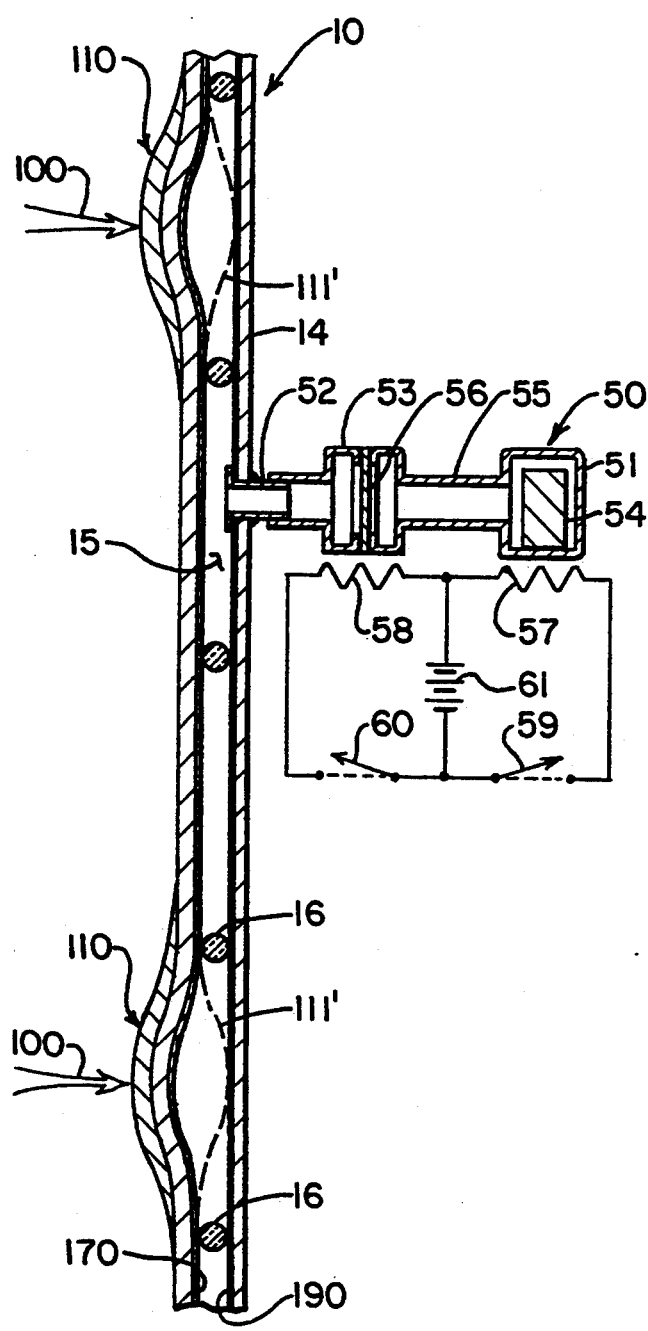
FIG. 12 is an enlarged cross-sectional view of a compact vacuum insulation panel according to this invention with an alternate embodiment gas control apparatus and illustrates the bimetallic laminate switches on the opposite side of the panel for passive actuation by the heat in the environment being controlled.

An alternate embodiment gas control apparatus 50 is shown in FIG. 12. It has a metal container 51 for the metal hydride pellet 54, but the metal container 51 is not made of palladium or any other hydrogen permeable material. The hydrogen gate 56 is a piece of palladium foil mounted in a separate metal container 53 that is also impermeable to hydrogen. The container 53 and palladium foil gate 56 can be heated separately from the container 51 and metal hydride pellet 54. The two containers are connected by a duct 55. The container 53 is connected to the chamber 15 in insulation panel 10 by nipple 52 that is welded to sidewall 14. The palladium hydrogen gate 56 occludes the entire passage between vacuum chamber 15 and container 51, so it has to be heated to a temperature where it is permeable to hydrogen before hydrogen can pass from metal hydride 54 to chamber 15 or vice versa.

Two heating elements 57, 58 are provided for heating the metal hydride 54 and hydrogen gate 56, respectively, and each heating element 57, 58 can be turned "on" and "off" independently of the others by respective switches 59, 60. Therefore, when it is desired to disable the compact vacuum insulation panel 10 to allow heat 100 to flow through the panel 10, both heating elements 57 and 58 would be "turned on." The heating element 57 heats metal hydride 54 to release hydrogen, and heating element 58 heats the palladium hydrogen gate 56 to allow the hydrogen to pass through duct 55 and nipple 52 into chamber 15. Then both heating elements are "turned off", allowing the gate 56 and metal hydride 54 to cool. The cooled metal hydride 54 creates a reduced hydrogen pressure in container 51, but the hydrogen gas in chamber 15 is prohibited from returning to container 51 by the cooled hydrogen gate 56. Therefore, the insulation panel 10 remains disabled by the hydrogen gas in chamber 15 without continuous power drain from electric power source 61 and without additional heat production from heating elements 57, 58.

When it is desired to re-enable insulation panel 10 against transfer of heat 100, momentary heating of only the palladium gate 56 with heating element 58 is required. This heating of element 58 has to be maintained just long enough to allow the hydrogen in chamber 15 to flow back into container 51, where it can be reabsorbed by the cool metal hydride 54. Once the hydrogen is sufficiently removed from chamber 15 to re-enable the insulation panel 10, as described above, the heating element 58 can be "turned off." Again, similar to the gas control apparatus 20 described above, this alternate gas control apparatus 50 requires consumption of power and creation of heat only during transition between enabled and disabled modes of compact vacuum insulation panel 10.

Of course, partial disablement of the insulation panel 10 can be accomplished according to this invention by heating the metal hydride 54 only enough to release sufficient hydrogen to partially disable the insulative effect of the vacuum in chamber 15. Such partial heating of the metal hydride 54 can be accomplished by limiting the time that the heating element 21 or 57 is powered to only the time necessary to release the desired amount of hydrogen. Consequently, the insulative effect of panel 10 can be set anywhere between its fully enabled or its fully disabled conditions by controlling the extent to which the metal hydride is heated.

Suitable metal hydride 24 or 54, such as zirconium hydride, is available commercially in pellet form and is satisfactory for the purposes of this invention. In a sample compact vacuum insulation panel 10 with overall dimensions of 0.5 m $\times$ 0.5 m with 0.5 mm sidewalls 12, 14 spaced about 2.5 mm apart, fully reversible, repeatable and controllable variations in thermal resistance over a range of less than 0.2 to more than 0.7 m$^2$K/W (1.1 to 4° F. ft.$^2$ hr/Btu) were measured. Higher maximum thermal resistances, such as in the range of 3.5 m$^2$K/W (20° F. ft.$^2$ hr/Btu) are expected for larger panels with improved design parameters and features, such as the thin foil edge seals 66 (FIG. 3).

Figure 13:
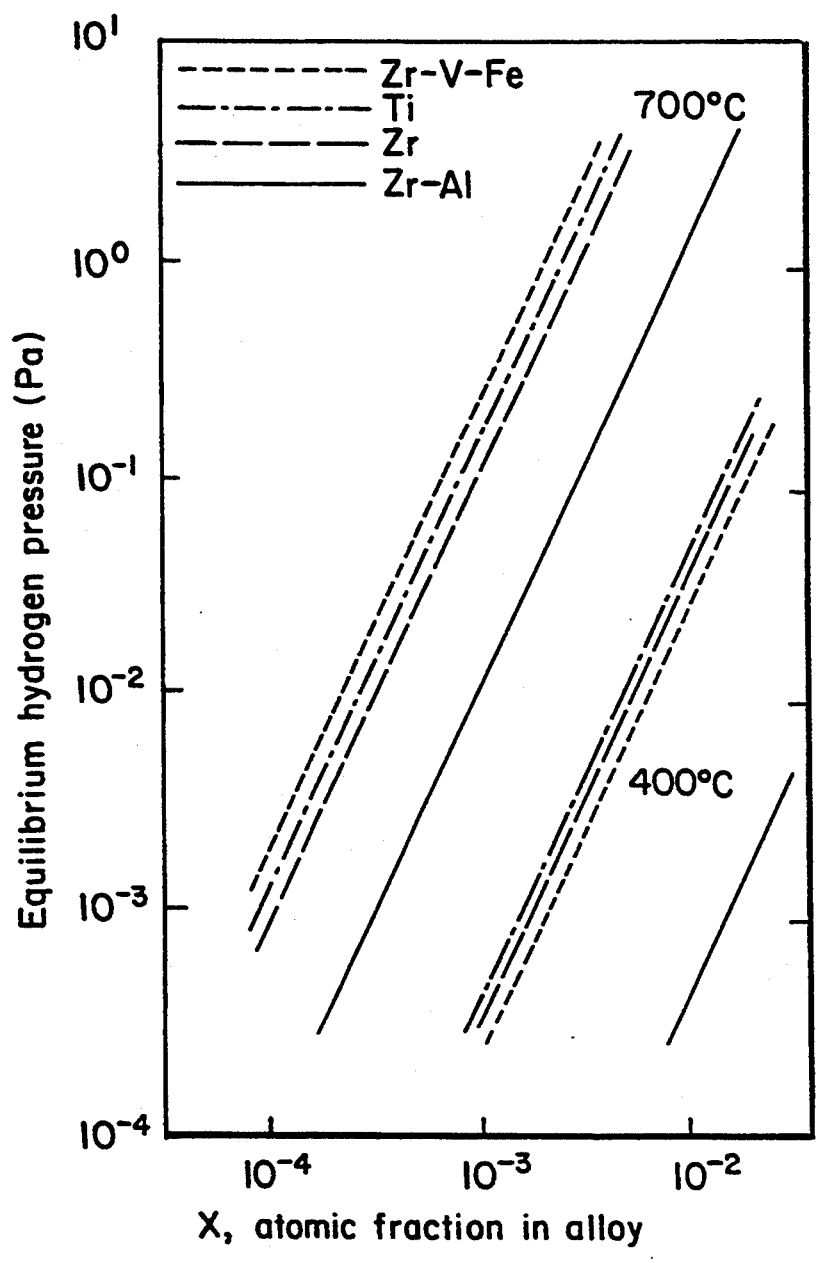
FIG. 13 is a chart that shows example equilibrium hydrogen pressures over various hydrides of zirconium and titanium alloys.
Figure 14:
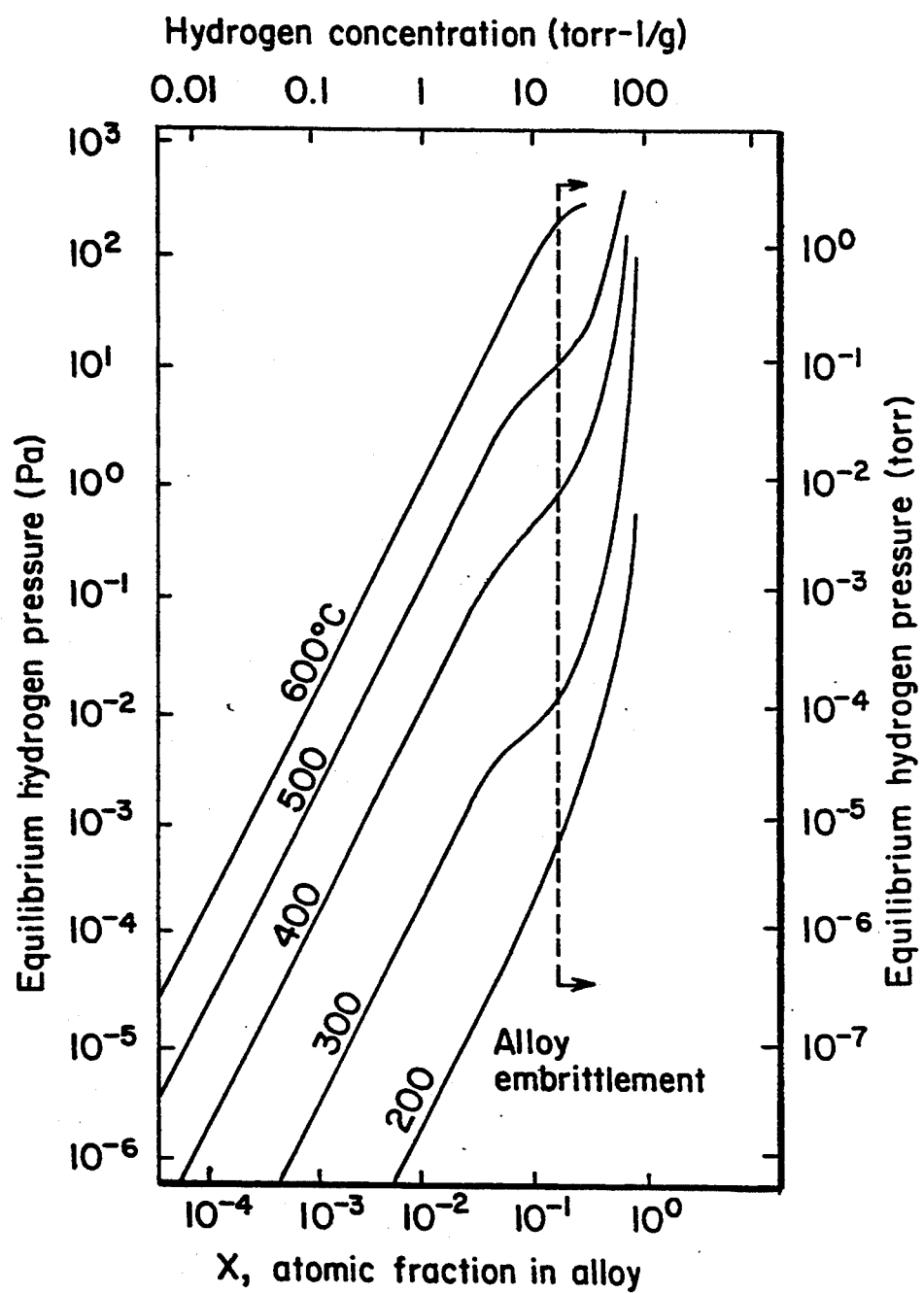
FIG. 14 is a chart that shows example equilibrium hydrogen pressures of various iron, zirconium, and vanadium alloys.

The thickness of the chamber 15 of the vacuum insulation panel 10 dictates the critical pressure, $P_c$, of hydrogen needed to saturate the gas-phase conductance and thereby inactivate or disable the insulative effect of panel 10. For example, for a panel 10 with a gap of 3 mm between sidewalls 12, 14, this critical hydrogen pressure is about one pascal or $10^{-5}$ atmospheres ($7.5 \times 10^{-3}$ torr). The critical pressure, $P_c$, can be reached by heating the metal hydride 24 or 54 to a temperature at which it is in thermodynamic equilibrium with hydrogen at the critical pressure, $P_c$, as illustrated in FIGS. 13 and 14. For example, with a value of $x=0.01$ in the $ZrH_x$ hydride, the hydride disassociation temperature required is nearly 600° C., whereas for $x=0.1$, the required disassociation temperature is only about 450° C. As the hydrogen is evolved from the hydride, the value of x decreases, and, consequently, so does the equilibrium hydrogen pressure that can be sustained by the hydride at the disassociation temperature. Therefore, the value of x for the $ZrH_x$ must be selected somewhat higher than the final value at the hydride operating temperature.

Enough hydride must be used to provide the required amount of hydrogen, x, in the hydride large enough to remain above the critical value associated with the critical hydrogen pressure, $P_c$, at the hydride operating temperature. However, the amount of hydride is not dependent on the thickness of the chamber 15, because the critical pressure is inversely proportional to the chamber 15 thickness between sidewalls 12, 14, while the volume of hydrogen at the critical pressure is directly proportional to chamber 15 thickness. These two parameters cancel each other to make the amount of hydride required independent of chamber 15 thickness.

Figure 15:
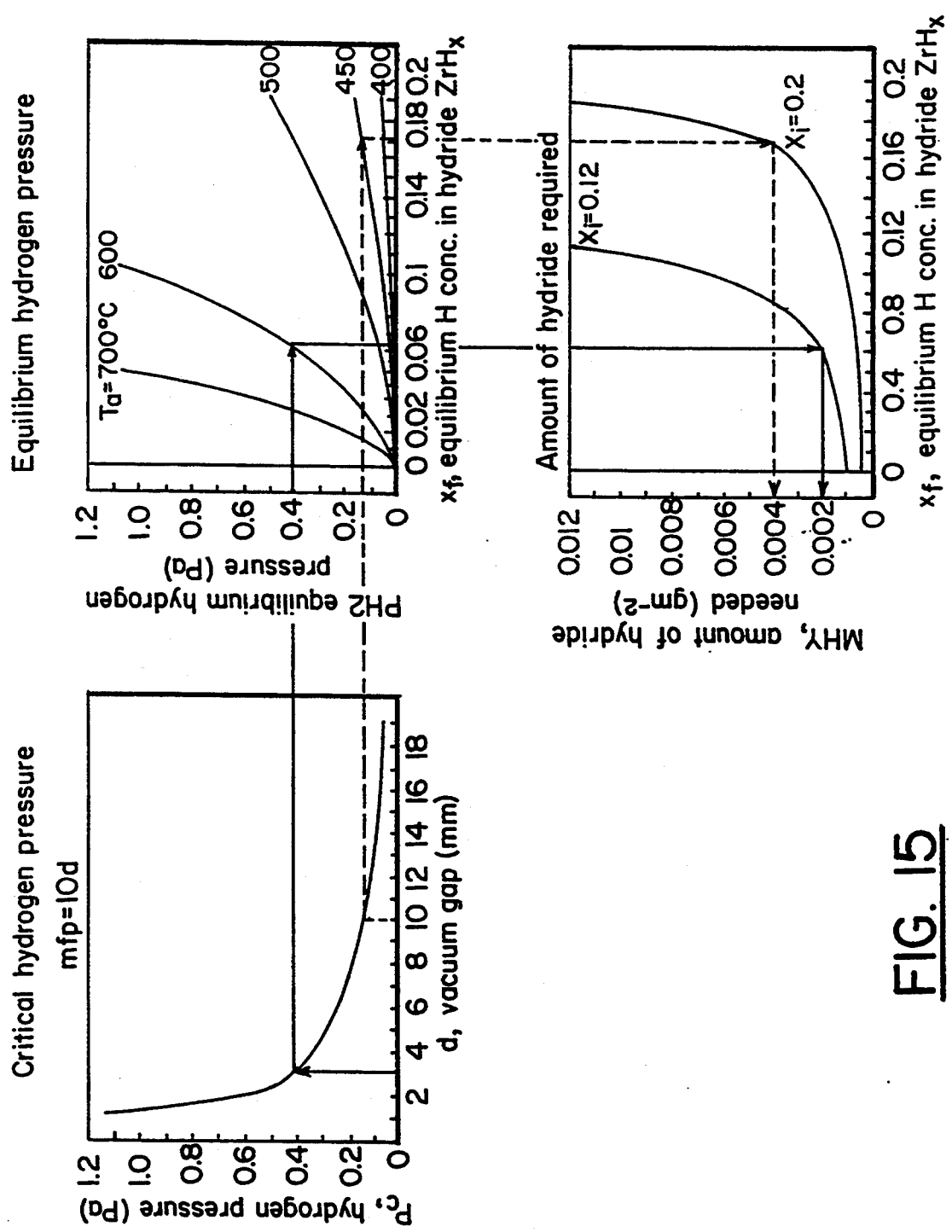
FIG. 15 is a graphical illustration of the selection of design parameters for dynamic compact vacuum insulation leading to the determination of the amount of hydride required per unit area.

A graphical illustration of the steps to follow in selection of design parameters for a compact vacuum insulation panel 10 leading to the determination of the amount of hydride required per unit area of the panel 10 is shown in FIG. 15. More or less hydride alloy can be used, depending on how high an operating temperature is chosen for the hydride and how large a value of $x_{initial}$ is used. However, operating at higher temperatures may cause other design problems, such as excessive heat loss from the hydride, and the use of too high a value of $x_{initial}$ might risk hydride degeneration due to embrittlement. Therefore, the design of the hydride component requires judicious selection of these parameters.

The variable emissivity coating 170, as mentioned above, can be either for passive, i.e., designed for reactive, automatic response to changes in the temperature of the environment to be insulated with compact vacuum insulation panel 10, or they can be active, i.e., controllable externally as desired by the user, to enable and disable the insulative effect of panel 10. Both of the passive and active applications, however, utilize materials that have the characteristic of variable emissivity, i.e., variable emission of radiation, primarily infrared radiation, as a function of temperature. For example, a thermochromic material, such as vanadium oxide, exhibits high thermal emittance characteristics when it is in an electrically insulating state. Conversely, when in a metallic state, vanadium oxide has a low emittance. Vanadium oxide changes from the emissive, electrically insulating state to the non-emissive, metallic state as a function of temperature. When it is hot, it becomes more emissive, and when it cools, it becomes less emissive. Vanadium oxide can be doped to vary through a full range of emissivity, from about 0.05 to about 0.8, within about five degrees celsius (5° C.) temperature change.

Therefore, when vanadium oxide is coated on a surface of a sidewall 12 of the compact vacuum insulation panel 10, as shown in FIG. 6, it forms a variable emissivity coating 170. When there is little heat 100 adjacent sidewall 12, the temperature of the sidewall 12 is relatively low, and the corresponding emissivity of coating 170 is also low, thereby effectively inhibiting heat transfer by radiation across evacuated chamber 15 from sidewall 12 to sidewall 14 by infrared radiation. However, as more heat 100 builds up adjacent sidewall 12, the coating 170 becomes more emissive and radiates more heat, thus causing the panel 10 to become less insulating. Consequently, in the transition temperature range designed into the variable emissivity coating 170, the compact vacuum insulation panel 10 is effectively disabled or "turned off" as an insulation panel.

Of course, an artificial heating device, such as an electric coil (not shown) adjacent or even in the sidewall 12 could be used to actively heat or not heat, thus control, the emissivity of coating 170 for active selection of enabled or disabled insulative effect of panel 10. The more the coating 170 is heated, the hotter, thus more emissive it becomes, so it can be controlled in this manner to vary the insulative effect of panel 10 or to set it anywhere between its maximum enabled or disabled limits.

As mentioned above, it may be beneficial to not provide any low emissivity coating on the opposite sidewall 14, which could work to reflect and thereby offset the increased radiative thermal transfer obtained by increasing the emissivity of the coating 170 on sidewall 12. Other thermochromic materials besides vanadium oxide could also be used for variable emissivity coatings that enable and disable compact vacuum insulation panel 12 in response to temperature changes. For example, titanium oxide ($Ti_2O_3$), nickel sulfide (NiS), and vanadium oxy fluoride ($VO_{2-x}F_x$) are also actively thermochromic and would be suitable materials for use as variable emissivity coating 170.

Figure 16:
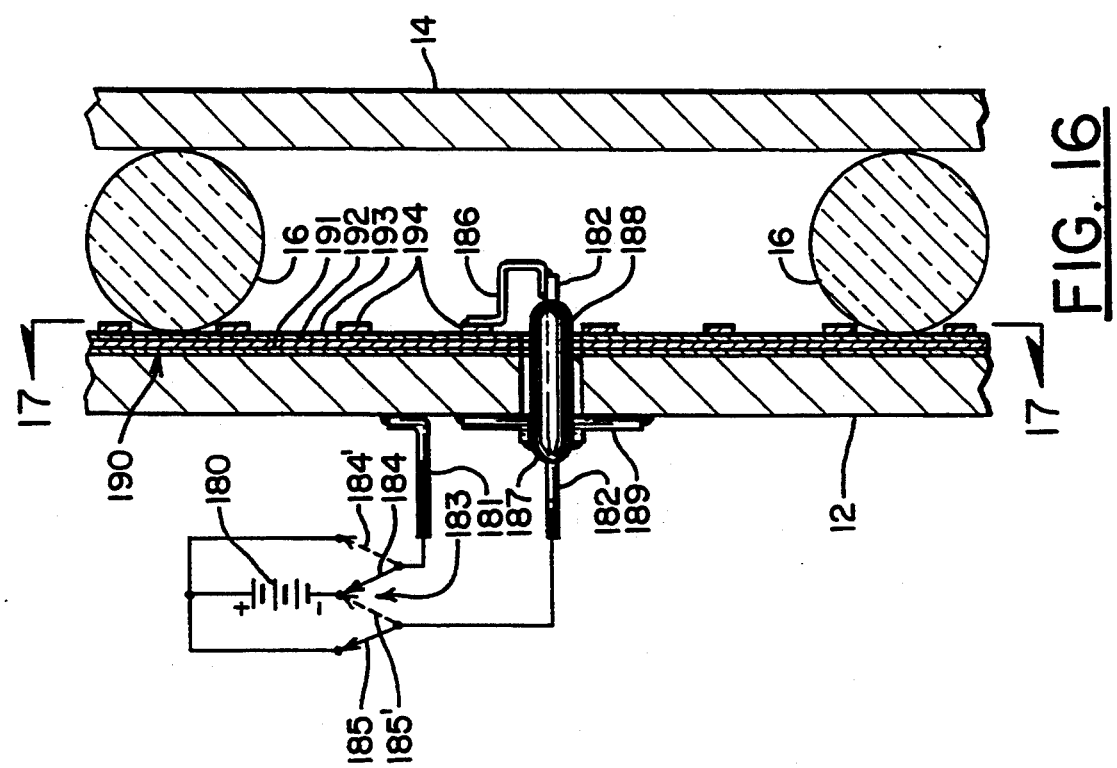
FIG. 16 is an enlarged cross-section of an insulation panel equipped with an electrochromic variable emissivity coating according to this invention.

An alternative variable emissivity coating 190, as shown in FIG. 16, may include an electrochromic material 193, such as nickel hydroxide ($Ni(OH)_2$) or tungsten trioxide ($WO_3$), which changes its emissivity in response to application of an electric potential. Such an electrochromic, variable emissivity material may be more desirable than a thermochromic material described above for active control of emissivity, since electric potential is so easy to control.

Figure 17:
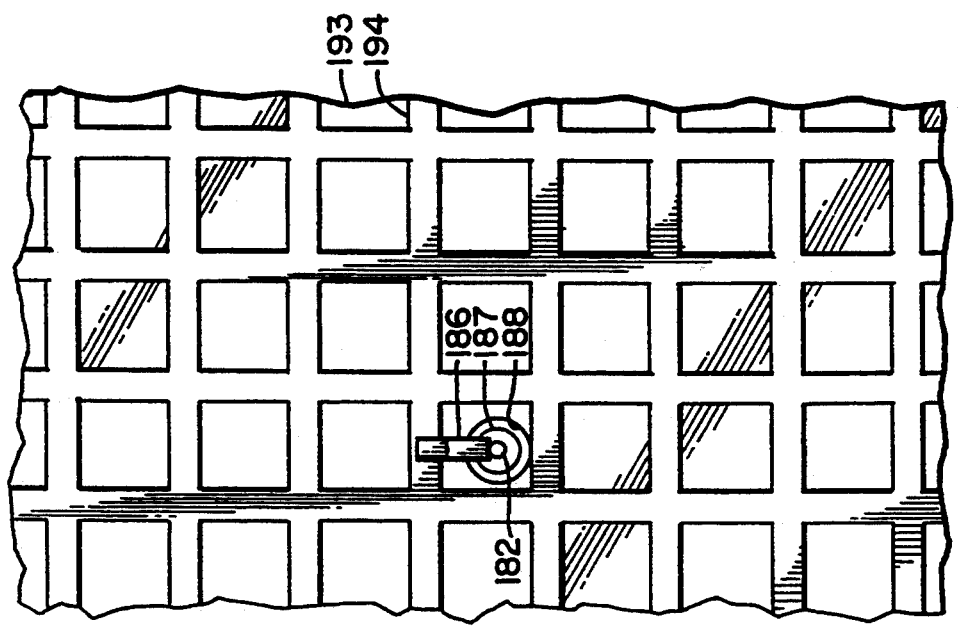
FIG. 17 is a cross-sectional view of the surface of the electrochromic variable emissivity coating taken along line 17—17 of FIG. 16.

Referring now to FIG. 16, the variable emissivity coating 190 on the inside surface of sidewall 12 of panel 10 comprises a counter electrode or ion storage layer 191 deposited onto the inside surface of metal sidewall 12, a layer of electron-blocking, ion conductive material 192 deposited on the counter electrode layer 191, and the layer of electrochromic material 193 is, in turn, deposited onto the ion conductor layer 192. Finally, a layer of electrically conductive material 194 is deposited on the electrochromic material 193 in the form of a grid, as illustrated in FIGS. 16 and 17. The portions of electrochromic material 193 that are not covered by grid 194 are exposed to, or facing, the opposite sidewall 14.

The electrochromic layer 193 changes from a colored, low emissivity state to a bleached, high emissivity state in response to a low voltage, DC current flow through the low emissivity coating 190 between sidewall 12 and grid 194. Therefore, the emissivity of coating 190 can be controlled and varied anywhere between a very low emissivity condition to a very high emissivity state by controlling the application and polarity of electrical potential across the variable emissivity coating 190.

Upon application of the electric potential in one polarity, ions are driven from the electrochromic material 193, whereupon the electrochromic material either becomes colored (low emissivity) or bleached (high emissivity), depending on the electrochromic material being used. The ion conductive layer 192 effectively blocks electron flow while allowing ion migration, and the counter electrode or ion storage layer 191 receives and retains ions. The ion migration stops as soon as the electric potential is turned off, so the electrochromic material can be set at almost any variation between its high emissivity and its low emissivity limits by switching off the electric potential. The ion migration can be reversed to flow back into the electrochromic layer 193, thus inducing it to change its emissivity in the opposite direction by applying an electric potential of reversed polarity long enough to drive the ions back into the electrochromic layer 193. Of course, application of the reverse polarity for a time less than that required to completely change the emissivity from one limit to the other results in partial change of emissivity, thus allowing the user to select the extent to which the insulation panel 10 is enabled or disabled. Once a desired emissivity has been reached, it will retain that emissivity for practical purposes as long as there is no electric potential applied across the coating 190. Therefore, as in other embodiments described above, electric power is required only during transition from one emissivity to another, but not to hold the coating 190 at any selected emissivity.

As mentioned above, suitable electrochromic materials for layer 193 include nickel hydroxide (Ni(OH)$_2$) and tungsten trioxide (WO$_3$), which can be selected and prepared to switch or vary emissivity predominately in the infrared portion of the spectrum. The ion conductor layer 192 may be lithium nitride (Li$_3$N), and the counter electrode 191 can be either molybdenum oxy fluoride (MOO$_2$F$_2$) or tungsten oxide (WO$_x$).

The reversible electric potential can be supplied by a DC power source 180 selectively connectable to metal sidewall 12 via lead 181 and to grid 194 via lead 182. A switch 183 with two contacts 184, 185 connected respectively to leads 181,182 can be used to connect the positive pole of source 180 to lead 182 and negative pole to lead 181 and, alternately, to connect the positive pole of source 180 to lead 181 and the negative pole to lead 182. Since lead 182 is connected through a link 186 to grid 194, those alternate positions 184', 185' of switch 183 apply opposite polarity DC potential across coating 190 as when the contacts are in the 184, 185 positions. The lead 182 extends through a mounting insert 187, which is a ceramic-to-metal sealed insulator similar to the insert 40 described above, inserted through a hole 188 in sidewall 12, and sealed by a metal collar 189 welded around its edges to the sidewall 12 to maintain the vacuum tight seal. The electrically conductive grid provides even and thorough application across the surface of the electrochromic material 193, while allowing substantial radiation surface of the electrochromic layer 193 uncovered by the grid 194 and exposed to the opposite sidewall 14. Consequently, when the electrochromic layer is in its emissive state, there is still substantial exposed surface area from which to emit infrared radiation across the chamber 15.

Thermal shorting switches in the form of bimetallic laminate switches 110 according to the present invention are also shown in the compact vacuum insulation panel 10 in FIG. 6 for turning the insulative effect of panel 10 "on" and "off." These bimetallic laminate switches 110 "turn off" the insulative ability of the panel 10 by establishing metal-to-metal contact between sidewalls 12 and 14 to create thermal short circuits, as described above. In the FIG. 6 embodiment, the switches 110 are positioned in sidewall 14 on the opposite side of panel 10 from the environment heat 100 that is supposed to be selectively confined or dissipated by the panel 10. In this orientation, they are more suited to active control by a user or control device external to the panel 10. However, they can also be positioned in the other sidewall 12 on the stone side of panel 10 as the heat source 100, where they can function more appropriately as passive or automatic thermal switches that turn the insulation panel 10 "on" and "off" in response to changes in temperature, as will be described in more detail below.

Referring now primarily to FIG. 6, each bimetallic laminate switch 110 comprises a bulged portion or section 111 of the metal sidewall 14. In FIG. 6, the bulge 111 is shown as outwardly convex in shape. The bulged portion 111 is overlayed with a layer of a different metal 112 that has a different coefficient of thermal expansion than the metal of the sidewall 14 or bulge 111. Therefore, the two metals 111 and 112 expand at different rates for each change in temperature. Since they are tightly laminated and adhered together so that they cannot slip in relation to each other, changes in temperature result in deformation of the bulge 111 due to differential expansion. For this application, the overlay metal 112 has a lesser coefficient of thermal expansion than the metal of sidewall 14, so a rise in temperature causes the bulge 111 to snap to an alternate deformation that is concave to the panel 10, as illustrated at 111' in FIG. 6. With appropriate sizing, the alternate deformed position 111' of bulge 111 will contact sidewall 12 and thereby form a thermal short to conduct heat directly from sidewall 12 to sidewall 14, as described above. The selection of the metal, thus coefficient of thermal expansion, in relation to the size of bulge 111 and coefficient of thermal expansion of the metal of sidewall 14, will determine the temperature at which the snap deformation to configuration 111' will occur.

In the FIG. 6, the panel 10 is shown equipped with an electrically resistive heating element 113 positioned adjacent the bimetallic switch 110 to provide a control heat source for causing the bimetallic switch 110 to snap to the alternate position 111'. Of course, any controllable heat source would be satisfactory. The purpose is to provide an active control or device to establish a thermal short between sidewalls 12 and 14 on demand, thereby effectively "turning off" the insulative effect of the compact vacuum insulation panel 10. Of course, such active control can also be used to "turn on" the insulative effect of panel 10 by operating in the reverse. In other words, if heating the bimetallic switch 110 "turns off" the insulative effect, "turning off" the heat source 113 and allowing the bimetallic switch to cool can "turn on" the insulative effect. Also, reversing the order of the laminate metals 111,112 can reverse the operation such that the heating element 113 "turned off" results in "turning off" the insulation and vice versa.

If the panel 10 is large, the thermal short at bimetallic switch 110 might be effective to "turn off" the insulation effect of panel 10 in the immediate vicinity of switch 110, but not over the entire surface area of the panel 10. While the metal sidewalls 12 and 14 are very good thermal conductors, they are not infinite thermal conductors. Therefore, it might be beneficial to provide additional bimetallic thermal switches 110 dispersed at spaced intervals from each other over the entire surface of the panel 10, similar to those shown in FIG. 5 or as represented by bimetallic thermal switches 110, 110' in FIG. 6. Additional heating elements similar to the heating element 113 can be provided for each of the bimetallic switches 110, 110', but such provision might not be necessary, if the bimetallic switches 110, 110' are not positioned too far apart. Once the bimetallic switch 110 is actuated by the heating element 113 to invert the bulge 111 to the concave position 111', and the heat 100 starts flowing from sidewall 12 to sidewall 14, the metal sidewall 14 will conduct heat to the next bimetallic switch 110' and cause it to deform to the concave position 111" as well. Being deformed to the metal-to-metal contact of concave position 111", the bimetallic switch 110' thereby initiates a thermal short at that location also. If the plurality of bimetallic switches 110 are close enough to each other, this process can continue or cascade from one bimetallic switch 110 to adjacent ones over the entire surface of the compact vacuum insulation panel 10, thereby switching the insulative effect of panel 10 "off" in a very positive and effective manner until there is insufficient heat 100 left to keep the bimetallic switches 110, 110' in their alternate or "unstable" positions. Upon cooling, they snap back to their stable, convex positions, thereby eliminating the metal-to-metal contacts and "turning on" the compact vacuum insulation panel 10.

In a more passive or automatic mode application, as illustrated in FIG. 12, the bimetallic switches 110 are positioned in sidewall 12 on the hot side of panel 10 where the heat 100 is located. In this kind of application, the bimetallic switches are actuated to switch to their unstable, concave positions 111' by the heat 100 when it reaches a temperature where the bimetallic switches 110 are designed to switch and establish the metal-to-metal contacts or thermal short. They remain in the unstable, concave positions, effectively disabling or "turning off" the compact vacuum insulation panel 10 until the heat 100 is sufficiently dissipated or until the source of heat 100 is deactivated or removed. When the sidewall 12 cools enough to cause the bimetallic switches to snap back to their stable, outwardly convex positions, the metal-to-metal contacts between sidewalls 12, 14 are broken, and the compact vacuum insulation panel 10 is effectively "turned back on."

Figure 18:
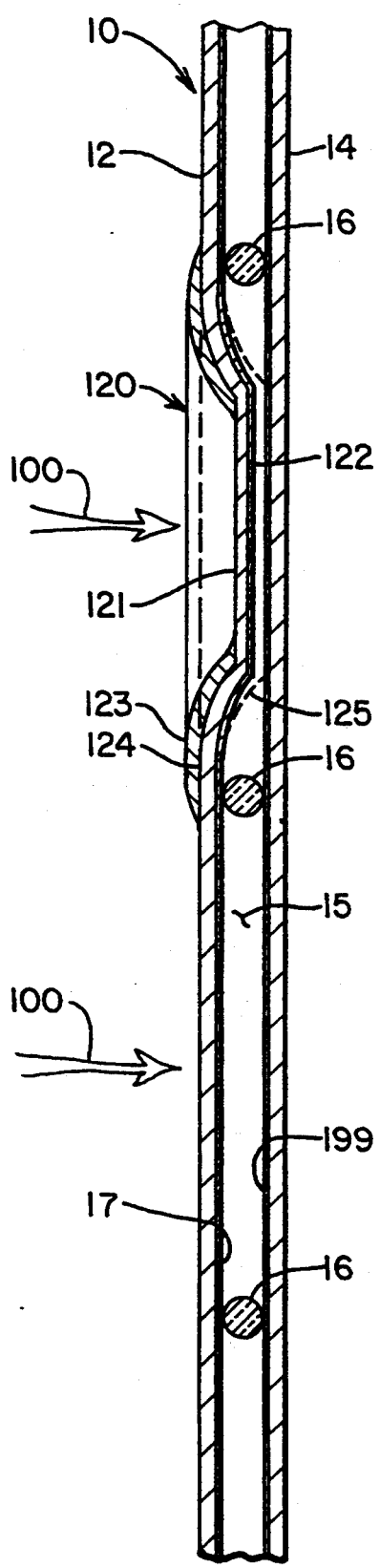
FIG. 18 is an enlarged cross-sectional view of a compact vacuum insulation panel equipped with an alternate bimetallic laminate metal-to-metal switch according to this invention.

In an alternate embodiment bimetallic switch 120, shown in FIG. 18, the sidewall 12 has depressions 121 formed therein with flat bottoms 122 to maximize surface area of metal-to-metal contact with sidewall 14. The different metal laminate 123 is overlayed on the curved rim 124 of the depression 121. Therefore, a rise in temperature causes the bimetallic spring to snap to its unstable position 125, causing the flat bottom 122 of depression 121 to make metal-to-metal contact with sidewall 14. The resulting thermal short "turns off" the compact insulation panel 10 in the same manner as described above. Cooling of the heat 100 and sidewall 12 results in the bimetallic spring 120 snapping back to its stable position, thereby "turning back on" the compact vacuum insulation panel.

Figure 19:
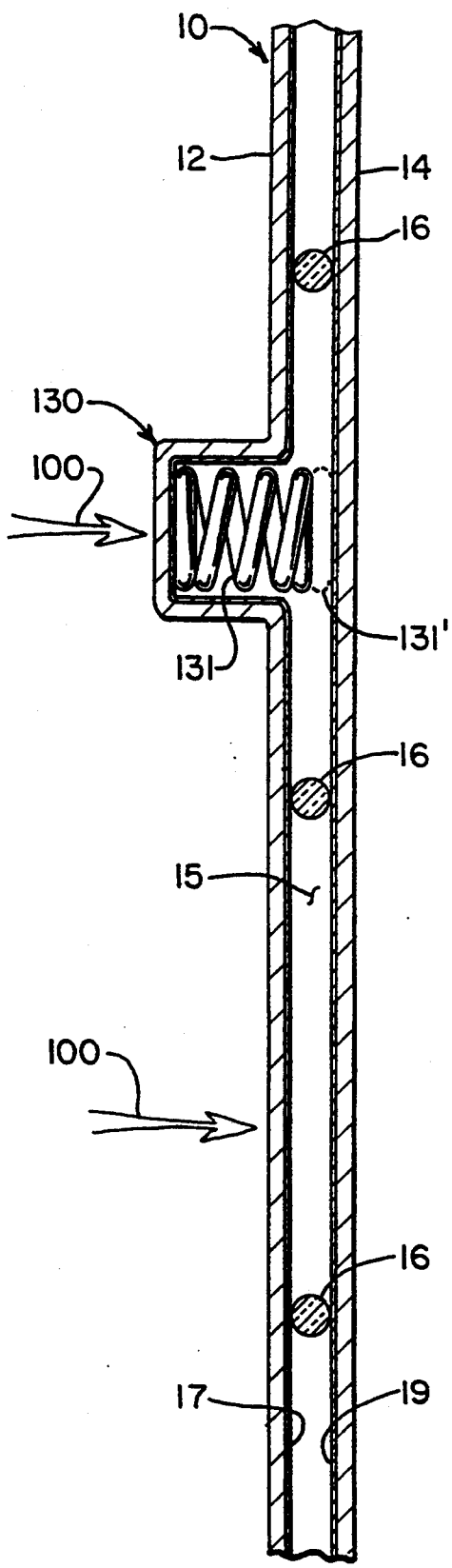
FIG. 19 is an enlarged cross-sectional view of a compact vacuum insulation panel equipped with an alternate embodiment metal-to-metal switch according to the present invention.

Another metal-to-metal switch embodiment 130 is shown in FIG. 19. The switch and contact actuator is a metal element 131 in the shape of a coiled spring, and it comprises one of a class of metal alloys that can be plastically deformed in one temperature range and maintains the deformation until a certain other temperature range is reached. At that other temperature range, the element springs back to its original configuration 131 to establish metal-to-metal contact and "turn off" insulation panel 10. Metal alloys that have the characteristic of accommodating and holding plastic deformation in one temperature range and then springing back to an original shape upon reaching a certain design temperature include metal alloys of titanium-nickel, copper-aluminum, and copper-aluminum-zinc.

In the FIG. 20 embodiment 140, a spring 141 is positioned in cups 142, 143 between sidewalls 12, 14 to bias the sidewalls 12, 14 apart. Intervening glass-like spacers 144, 145 between spring 141 and sidewalls 12, 14 prevent metal-to-metal conduction of heat 100 from sidewall 12 to sidewall 14 through internal spring 141. External springs 146, 147 are fabricated of a plastically deformable metal alloy such as those discussed above that spring back to an original shape upon reaching a certain temperature. They are positioned between relatively removeable objects 148, 149 and sidewalls 12, 14. In cooler temperatures where the external springs 146, 147 are plastically deformable by internal spring 14 1 to the normal position illustrated in FIG. 18. In this position, the compact vacuum insulation panel 10 is enabled or "turned on" to inhibit the flow of heat 100 through panel 10. However, when the heat 100 reaches a certain temperature, the external springs 146, 147 spring back toward original positions that overcome the force of internal spring 141 and push the sidewalls 12, 14 into contact with each other, as indicated by the broken lines 12', 14'. This metal-to-metal contact between sidewalls 12, 14 disables or "turns off" the compact vacuum insulation panel 10.

In another thermal shorting switch embodiment illustrated in FIGS. 21 and 22, the metal-to-metal contact is made by a nonlaminated bimetallic switch 210. This switch 210 is in the form of a concave dimple or depression 212 in one of the metal sidewalls 12 of panel 10. The dimple 212 comprises a metal or metal alloy that has a higher coefficient of thermal expansion than the surrounding metal sidewall 12. Consequently, as the respective metals of dimple 212 and sidewall 12 are heated, as by a heat source 100, the metal comprising dimple 212 is effectively confined and restrained around its entire perimeter 214 by the metal of sidewall 12. Since the metal comprising dimple 212 has a higher coefficient of expansion than the metal of sidewall 12, it has to expand in a direction that is not constrained by the metal of sidewall 12, which is in a direction normal to the plane of sidewall 12, as illustrated by the broken line 212' in FIG. 22. Therefore, with sufficient heat 100 and sufficient expansion of the metal of dimple 212, the dimple 212 will expand to the position 212' where it makes metal-to-metal contact with the opposite sidewall 14, thus creating the desired thermal short to "turn off" the insulated effect of the panel 10. Cooling of the metal of dimple 212 will, of course, result in contraction of the dimple 212 away from sidewall 14, thereby re-enabling the insulative effect of panel 10. As in other thermal shorting switch embodiments described above, this switch 210 can also be actuated actively by a heating element (not shown) that can be turned "on" and "off" when positioned adjacent the switch 210.

Another variation of thermal shorting switch 230 is shown in FIG. 23, wherein a concave dimple or depression 232 is formed in a sidewall 12 of panel 10. However, in this embodiment, the dimple 232 comprises the same metal as sidewall 12, but it is confined at its edges by removeable anchors 234,236 that are welded or otherwise affixed to sidewall 12. As the metal of dimple 232 is heated by a heat source 100, it expands. However, since it is confined at its edges by removeable anchors 234, 236, the dimple will expand in a direction perpendicular to the plane of sidewall 12 toward the opposite sidewall 14. With sufficient heat and expansion, therefore, the dimple 232 will expand to the position shown by broken line 232, where it contacts the opposite sidewall 14 and creates a thermal short across the panel 10. Upon cooling, the dimple 232 contracts away from sidewall 14, thus re-enabling the insulative effect of panel 10.

Figure 24:
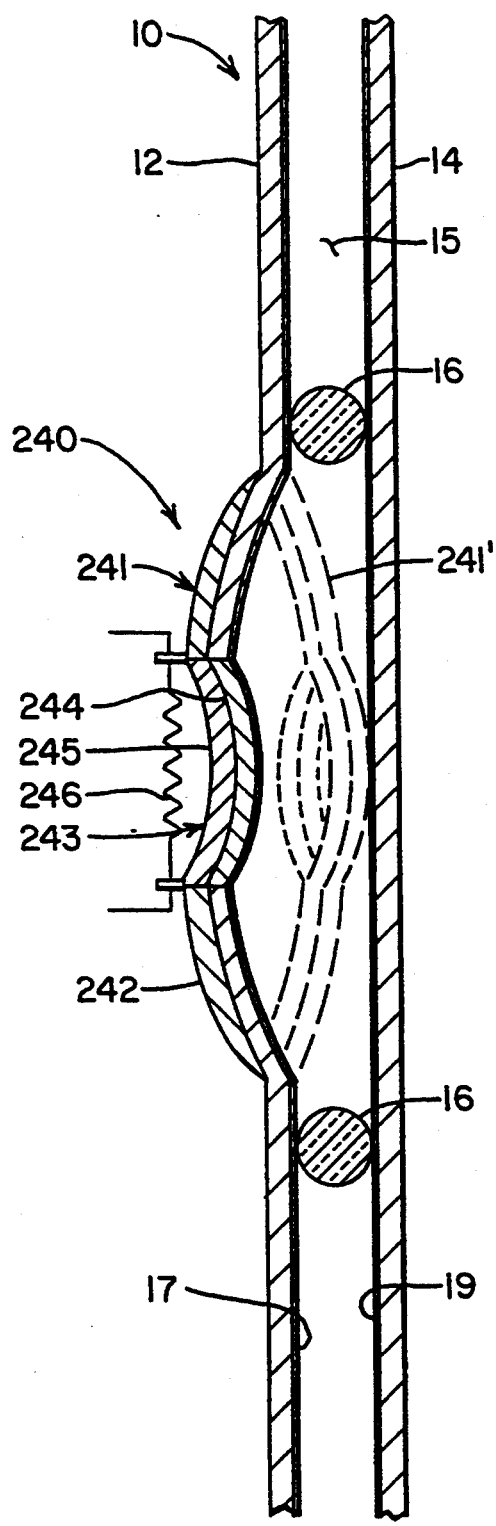
FIG. 24 is an enlarged cross-sectional view of a compact vacuum insulation panel equipped with an active metal-to-metal switch.
Figure 25:
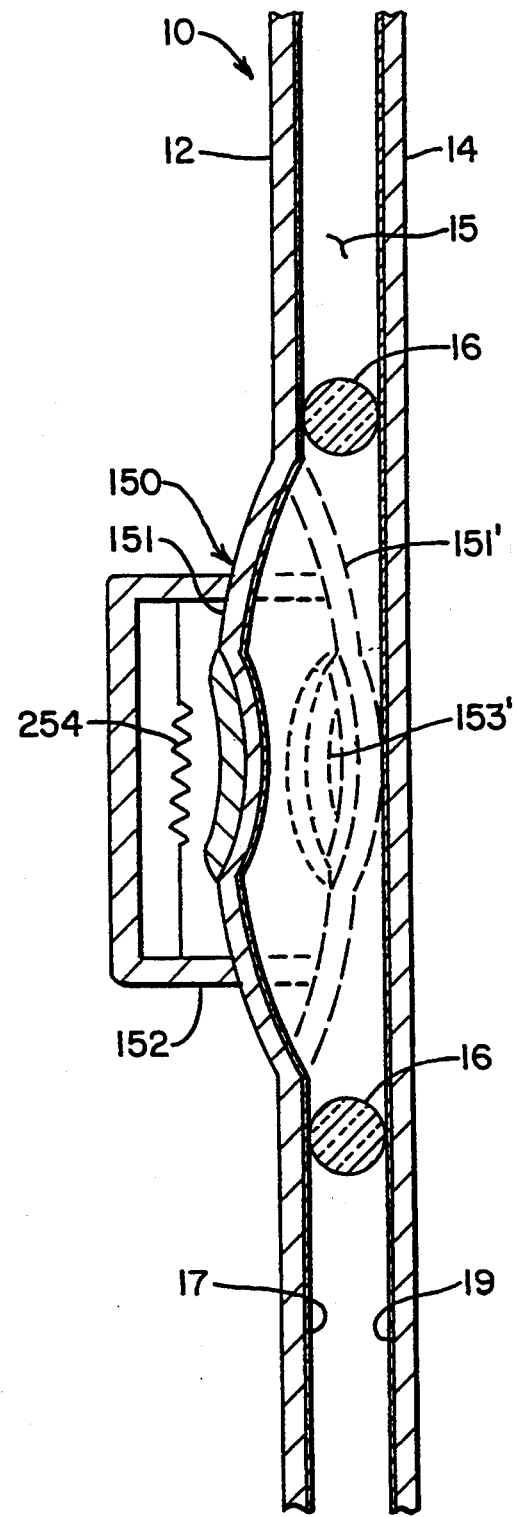
FIG. 25 is an enlarged cross-sectional view of a compact vacuum insulation panel equipped with a manual push-button metal-to-metal switch with an active bimetallic device to re-enable the insulation panel.

Still another metal-to-metal thermal shorting switch embodiment 240 is shown in FIG. 24, which can be actively switched to turn the insulation back "on" after it is turned "off." In this embodiment 240, a bimetallic bulge 241, similar to the bimetallic convex bulge of switch 110 discussed above, is provided in one sidewall 12. This bimetallic bulge comprises a metal 242 laminated onto the sidewall metal, with the metal 242 having a larger coefficient of expansion than the metal of sidewall 12. Therefore, as it is heated the bimetallic bulge 241 snaps to the position 241' shown in broken lines.

The convex bulge 241 also has a smaller concave bulge 243 in its center. When the larger bulge 241 is in the position 241', the smaller bulge 243 is positioned in contact with the opposite sidewall 14, as shown by broken lines 243', to establish the metal-to-metal thermal short circuit. However, the smaller bulge 243 also comprises a bimetallic laminate of a metal 44 with a larger coefficient of thermal expansion laminate to a metal 245 with a smaller coefficient of thermal expansion on the outside. Therefore, when this smaller bulge is heated, as by a heater element 246, the small bulge will deform to the bistable position 243", thereby breaking the metal-to-metal contact with sidewall 14.

The metal-to-metal switch embodiment 150 comprises a bistable convex bulge 15 1 in sidewall 12, which can be pushed with a button 152 to its alternate bistable position 151' to establish the metal-to-metal contact with sidewall 14. This embodiment provides a manual switch for turning the insulation panel 10 "off." It can be turned "on" by pulling the button 152 out again to break the metal-to-metal contact. Alternatively, if the convex bulge 151 is equipped with a smaller concave bimetallic bulge 153, similar to the small, concave bimetallic bulge 243 in the FIG. 24 embodiment 240 and heater element 254, "turning on" the heater element 254 can cause the smaller bulge 253 to snap to its alternate bistable position 253' to break the metal-to-metal contact and "turn on" the insulation panel 10.

As discussed above, the above-described embodiments that implement the mechanisms of turning "off" and "on" the compact vacuum insulation panel 10 by alternately enhancing and inhibiting heat transfer by gas conduction, radiation, or metal-to-metal conduction according to this invention can be used either alone or in combination with one or more of those other embodiments. For example, the principal operative thermal transfer of panel 10 could be the gas control apparatus 10. At the same time, a back-up or override system of bimetallic laminate switches 110 could also be provided to thermal short-circuit the sidewalls 12, 14 in the event the gas control apparatus 20 fails or is insufficient to dissipate an unexpected large heat buildup. Other examples of beneficial combinations are legion, but are not necessary to describe for the purposes of this invention.

The foregoing description is considered as illustrative only of the principles of the invention. Further, since numerous modifications and changes will readily occur to those skilled in the art, it is not desired to limit the invention to the exact construction and processes shown as described above. Accordingly, all suitable modifications and equivalents may be resorted to falling within the scope of the invention as defined by the claims that follow.

The embodiments of the invention in which an exclusive property or privilege is claimed are defined as follows:

1. Dynamic compact vacuum insulation apparatus for variable inhibition of heat transfer from one environment to another, comprising:

two hard sidewall sheets of metal positioned in closely spaced apart relation to each other such that each of said sidewall sheets has an interior surface in juxtaposed relation to an interior surface of the other of said sidewall sheets, and wherein said two sidewall sheets are sealed together around their edges by metal-to-metal welds to form a chamber there between, said chamber being evacuated to an extent sufficient to substantially eliminate gas molecule conduction of heat from one of said sidewall sheets to the other;

a plurality of glass-like spacers positioned in said chamber between said sidewall sheets and spaced apart in relation to each other, said glass-like spacers being shaped to make "point" or "near point" contact with said sidewall sheets; and a variable emissivity coating on said interior surface of at least one of said sidewall sheets.

2. The dynamic compact vacuum insulation of claim 1, wherein said variable emissivity coating has a characteristic of infrared radiation emissivity that varies as a function of temperature.

3. The dynamic compact vacuum insulation of claim 1, wherein said variable emissivity coating has an infrared radiation emissivity that decreases as temperature of said variable emissivity coating decreases and increases as temperature of said variable emissivity coating increases.

4. The dynamic compact vacuum insulation of claim 1, wherein said variable emissivity coating has infrared emissivity that varies in response to application of DC electric potential across the variable emissivity coating.

* * * * *